United States Patent
Zimmermann

(10) Patent No.: US 6,314,190 B1
(45) Date of Patent: Nov. 6, 2001

(54) CRYPTOGRAPHIC SYSTEM WITH METHODS FOR USER-CONTROLLED MESSAGE RECOVERY

(75) Inventor: Philip Zimmermann, Menlo Park, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 09/090,771

(22) Filed: Jun. 4, 1998

Related U.S. Application Data

(60) Provisional application No. 60/048,787, filed on Jun. 6, 1997, and provisional application No. 60/053,523, filed on Jul. 22, 1997.

(51) Int. Cl.[7] .................................................. H04L 9/00
(52) U.S. Cl. ............................ 380/282; 380/30; 380/286
(58) Field of Search .................................... 380/282–286, 380/30; 713/165

(56) References Cited

U.S. PATENT DOCUMENTS

| | | |
|---|---|---|
| 4,200,770 | 4/1980 | Hellman et al. . |
| 4,405,829 | 9/1983 | Rivest et al. . |
| 5,276,737 | 1/1994 | Micali ................................. 380/30 |
| 5,315,658 | 5/1994 | Micali ................................. 380/30 |
| 5,436,972 | 7/1995 | Fischer ............................... 380/30 |
| 5,481,613 * | 1/1996 | Ford et al. ......................... 380/30 |
| 5,553,145 | 9/1996 | Micali ................................. 380/30 |
| 5,557,346 | 9/1996 | Lipner et al. ..................... 380/30 |
| 5,557,765 * | 9/1996 | Lipner et al. ................... 380/286 |
| 5,625,695 | 4/1997 | M'Raihi et al. .................. 380/30 |
| 5,629,982 | 5/1997 | Micali ................................. 380/30 |
| 5,647,000 | 7/1997 | Leighton ........................... 380/30 |
| 5,768,388 | 6/1998 | Goldwasser et al. ............ 380/30 |
| 5,815,573 | 9/1998 | Johnson et al. ................. 380/21 |
| 5,872,849 | 2/1999 | Sudia ................................. 380/49 |

* cited by examiner

*Primary Examiner*—Gail Hayes
*Assistant Examiner*—Ho S. Song
(74) *Attorney, Agent, or Firm*—Patrick J. S. Inouye; Christopher J. Hamaty

(57) ABSTRACT

A cryptosystem is described which automatically provides an extra "message recovery" recipient(s) when an encrypted message is generated in the system. The system is typically configured such that the extra recipient or "message recovery agent" (MRA)—an entity which itself has a public key (i.e., a MRA public key)—is automatically added, under appropriate circumstances, as a valid recipient for an encrypted message created by a user. In a corporate setting, for example, the message recovery agent is the "corporate" message recovery agent designated for that company (firm, organization, or other group) and the user is an employee (or member) of that company (or group). In operation, the system embeds a pointer (or other reference mechanism) to the MRA public key into the public key of the user or employee, so that encrypted messages sent to the company's employees from outside users (e.g., those individuals who are not employees of the company) can nevertheless still be recovered by the company. Alternatively, the MRA public key itself can be embedded within the public key of the employee or user (i.e., a key within a key), but typically at the cost of increasing the storage requirement of the user's key. By including in the user's key (e.g., an employee) a pointer to a message recovery agent's key (or the MRA key itself), the system provides a mechanism for assisting a user outside a group (e.g., a user who is outside a particular company) with the task of including in an automatic and non-intrusive manner the key of an additional recipient, such as one intended for message recovery.

31 Claims, 14 Drawing Sheets

Microfiche Appendix Included
(1 Microfiche, 41 Pages)

CRYPTOGRAPHIC SYSTEM WITH METHODS FOR USER-CONTROLLED MESSAGE RECOVERY

The present application claims the benefit of priority from commonly-owned provisional application Ser. No. 60/048,787, filed Jun. 6, 1997, entitled CRYPTOGRAPHIC SYSTEM WITH METHODS FOR KEY RECOVERY, by inventor Philip Zimmermann, and further claims the benefit of priority from commonly-owned provisional application Ser. No. 60/053,523, filed Jul. 22, 1997, entitled CRYPTOGRAPHIC SYSTEM WITH METHODS FOR USER-CONTROLLED MESSAGE RECOVERY, by inventor Philip Zimmermann. The disclosures of the foregoing applications are hereby incorporated by reference.

REFERENCE TO MICROFICHE APPENDIX

A microfiche appendix is part of the specification which includes one microfiche of 41 frames.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to cryptographic systems and, more particularly, to methods for providing cryptographic key recovery in such systems.

With each passing day, more and more computers are connected together through pervasive open networks, such as the Internet, Wide Area Networks (WANs), and the like. With the ever-increasing popularity of such environments comes the need for exchanging messages and other documents in a secured fashion over an open communication network. To this end, some sort of cryptographic systems is usually employed.

Generally, cryptographic systems use either "secret-key" encryption or "public key" encryption. In "secret-key" encryption, a single key is used for both encryption and decryption. Consider, for example, a user (sender) who wants to send an e-mail message to a colleague (recipient) in a secured manner, such that no one who intercepts the message will be able to read it. If the sender employs a cryptographic "secret key" to encrypt the message, the recipient, in turn, must also use the same key to decipher or decrypt the message. As a result, the same key must be initially transmitted via secure channels so that both parties can know it before encrypted messages can be sent over insecure channels. This is typically inconvenient, however. A better approach is, therefore, sought.

Public key cryptography overcomes the problem by eliminating the need for a single "secret" key. As illustrated in FIG. 1A, each user of a public key cryptographic system has two mathematically-related keys, a "public key" and a secret or "private key." Operating in a complementary fashion, each key in the pair unlocks the code that the other key makes. Knowing the public key does not help deduce the corresponding private key, however. Accordingly, the public key can be published and widely disseminated across a communications network, such as the Internet, without in any way compromising the integrity of the private key. Anyone can use a recipient's public key to encrypt a message to that person, with the recipient, in turn, using his or her own corresponding private key to decrypt the message. One's private key, on the other hand, is kept secret, known only to user.

Keys are typically stored on "keyrings." Public keys, including a user's own as well as those of colleagues', are stored in a "public keyring" file. A user's private key is, in a similar fashion, stored in a "private keyring" file. Each key pair has a User ID (such as the owner's name and e-mail address) so that the user and the user's colleagues can identify the owners of keys. Each private key also has a passphrase, or verbose password, that protects it. No one but a message's intended recipient can decrypt the message, not even the person who originally encrypted the message, because no one else has access to the private key necessary for decrypting the encrypted message.

Since public key cryptography provides privacy without the need for the same kind of secure channels that conventional secret key encryption requires, it is commonly employed to send secured messages and other documents from one individual to another across a network or other communication channel, including the Internet. An example of its use in a commercial product today includes PGP™, available from Pretty Good Privacy, Inc. of Santa Clara, Calif.

Keys are also used to digitally sign a message or file and, in a complementary manner, to verify a digital signature. These "digital signatures" allow authentication of messages. When a user signs a message, a cryptographic program uses that user's own private key to create a digital signature that is unique to both the contents of the message and the user's private key. Any recipient can employ the user's public key to authenticate the signature. Since the signer, alone, possesses the private key that created that signature, authentication of a signature confirms that the message was actually sent by the signer, and that the message has not been subsequently altered by anyone else. Forgery of a signed message is computationally infeasible.

By way of summary, FIG. 1B illustrates the functions for which public and private keys are used when sending and receiving messages. When keys are used to secure files stored on a user's own computer or local network server, the user is both the "sender" (the person who saves the file) and the "recipient" (the person who opens the file).

Cryptographic systems, including ones implementing public key cryptography, are described in the technical, trade, and patent literature. For a general description, see e.g., Schneier, Bruce, *Applied Cryptography*, Second Edition, John Wiley & Sons, Inc., 1996. For a description focusing on the PGP™ implementation of public key cryptography, see e.g., Garfinkel, Simon, *PGP: Pretty Good Privacy*, O'Reilly & Associates, Inc., 1995. The disclosures of each of the foregoing are hereby incorporated by reference.

Despite the benefits of public key cryptographic products, a particular problem arises in their everyday use, however. Specifically, oftentimes there exists a need for an authorized party other than the sender or the recipient to have access to an encrypted message since the recipient of the message might not always be available. Consider, for instance, an employee of a company who receives an important document for the company when an encrypted e-mail message. Further, the company needs access to the document in order to submit a timely proposal but the employee is not available, for instance the employee has left the company or is away on vacation. As perhaps a more common scenario, the employee is available but he or she has "lost" his or her private key, which is needed to decrypt the encrypted e-mail message. This can occur, for example, if the employee forgets the passphrase that is required to access his or her own private key. All told, there exists a need for additional techniques to decrypt an encrypted message so that authorized parties other than the recipient can have access to the encrypted message.

SUMMARY OF THE INVENTION

A cryptosystem constructed in accordance with the present invention automatically provides an extra recipient (s) as each message (e.g., e-mail, binary file, ASCII (text) file, or the like) is encrypted. In an exemplary embodiment, the system is configured such that the extra recipient or "message recovery agent" (MRA)—an entity which itself is in possession of an "MRK" or "message recovery key" (also referred to herein as an "ADK" or "additional decryption key")—is automatically added, under appropriate circumstances, as a valid recipient for an encrypted message created by a user. In a corporate setting, for example, the message recovery agent is the "corporate" message recovery agent designated for that company (firm, organization, or other group) and the user is an employee (or member) of that company (or group). During typical use, therefore, all messages created by the system automatically include the message recovery agent as an additional recipient.

During creation of an encrypted message, the public key of the message recovery agent is employed to create an encrypted copy of the random session key which is used to block-cipher encrypt the message. In a complementary manner, the private key of the message recovery agent can be used, if and when needed, to decrypt the session key, thus allowing decryption of the encrypted message. In this manner, the encrypted messages created by the system can be recovered by the company or organization authorized to act as the message recovery agent.

In the most preferred embodiment, the cryptosystem embeds a pointer (or other reference mechanism) to the MRA public key into the public key of the user or employee, so that encrypted messages sent to the company's employees from outside users (e.g., those individuals who are not employees of the company) can nevertheless still be recovered by the company. This constitutes a request by the intended recipient that the sender should encrypt with both keys. Alternatively, the MRA public key itself can be embedded within the data structure of the public key of the employee or user (i.e., a key within a key), but at the cost of increasing the storage requirements for the user's key.

A method of the present invention for assisting with recovery of messages sent to users includes the following method steps. Initially, a first key pair is generated for a particular user; the first key pair comprises a public key employed for encrypting messages sent to the particular user and a private key employed for decrypting messages which have been encrypted using the public key of the first key pair. Also, an additional or second key pair is generated for message recovery; this generation may be done at any point in time up to the point when the additional key (i.e., public key of the pair) is actually referenced in the public key of the first pair. For example, an MRK could be first generated for use by employees of a company. Then, as a new employee joins the company, the public key of his or her individual key pair is generated in such a manner to include a reference to the MRK. The additional or second key pair includes a public key employed for encrypting messages which have been encrypted using the public key of the first key pair and a private key employed for decrypting messages which have been encrypted using the public key of the second or additional key pair. The public key of the second or additional key pair is referenced (or embedded) within the data structure of the public key of the first key pair, thereby allowing recovery of messages which have been encrypted with the public key of the first key pair. Specifically, when the public key of the first key pair is employed during encryption of a message (e.g., for encrypting a session key used for block-cipher encrypting a message), the public key of the second key pair is automatically employed during the encryption process so that the message being encrypted can be recovered using the private key of the second key pair.

By including in the user's key (e.g., an employee) a pointer to a message recovery agent's key (or the MRA key itself), the present invention provides a mechanism for assisting a user outside a group (e.g., a user who is outside a particular company) with the task of including in an automatic and non-intrusive manner the key of an additional recipient, such as one intended for message recovery.

DETAILED DESCRIPTION OF A PREFERRED EMBODIMENT

The following description will focus on the presently-preferred embodiment of the present invention, which is typically operative in an environment providing application software running under the Microsoft® Windows operating system. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments that follows is for purposes of illustration and not limitation.

System Hardware

Figures 1A, 1B:
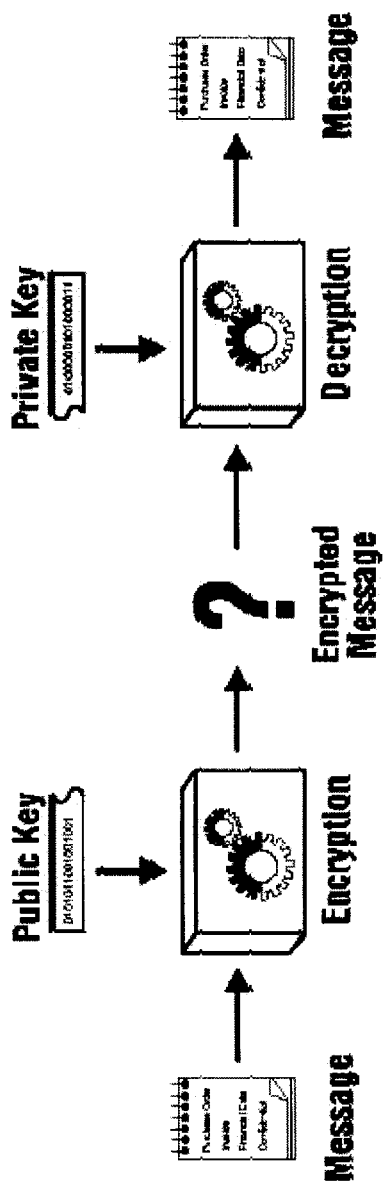
FIG. 1A is a block diagram illustrating general public key cryptography technique.
FIG. 1B is a table summarizing use of keys when sending and receiving messages.
Figure 2:
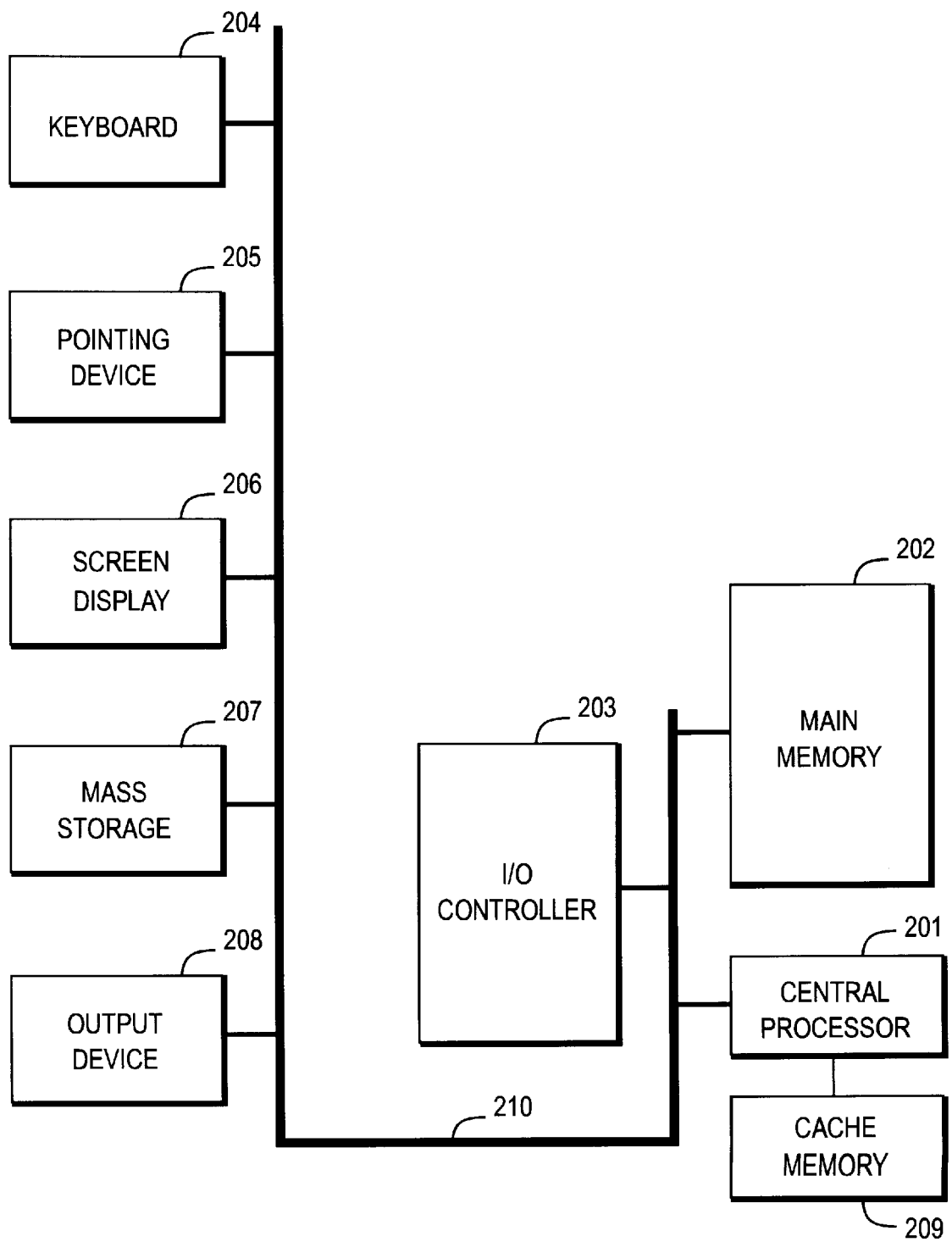
FIG. 2 is a block diagram illustrating a computer system in which the present invention may be embodied.

The invention may be embodied on a computer system such as the system 200 of FIG. 2, which comprises a central processor 201, a main memory 202, an input/output controller 203, a keyboard 204, a pointing device 205 (e.g., mouse, track ball, pen device, or the like), a display or screen device 206, and a mass storage 207 (e.g., hard or fixed disk, removable floppy disk, optical disk, magneto-optical disk, or flash memory). Although not shown separately, a real-time system clock is included with the system 200, in a conventional manner. Processor 201 includes or is coupled to a cache memory 209 for storing frequently accessed information; memory 209 may be an on-chip cache and/or external cache (as shown). A variety of other input/output device(s) 208, such as a modem, a scanner, a printer, a network card, or the like, may be included in the system 200 in a conventional manner, as desired. As shown, the various components of the system 200 communicate through a system bus 210 or similar architecture. In a preferred embodiment, the system 200 includes an IBM PC-compatible personal computer, available from a variety of vendors (including IBM of Armonk, N.Y.).

System Software

Figure 3:
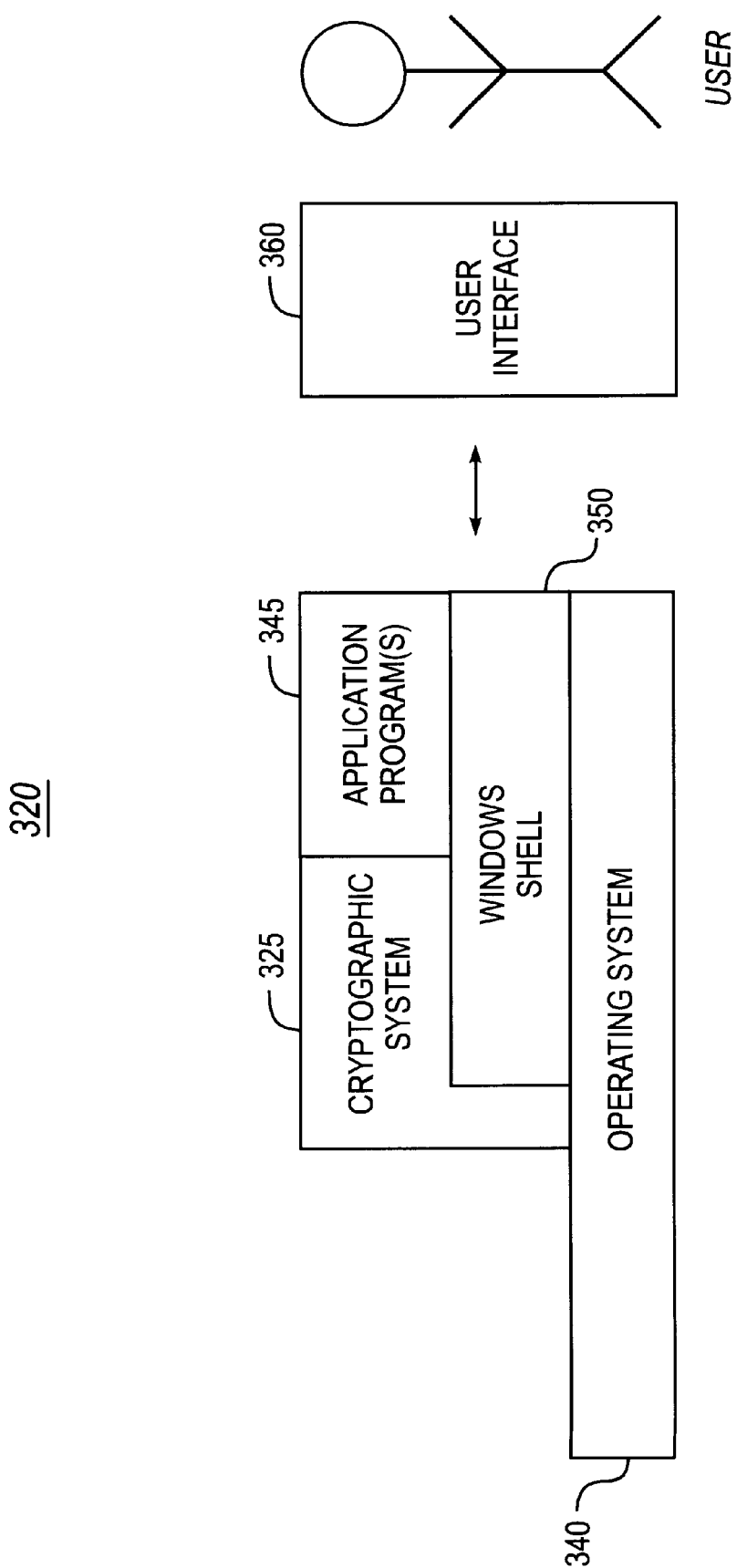
FIG. 3 is a block diagram of a computer software system for controlling the operation of the computer system of FIG. 2.

Illustrated in FIG. 3, a computer software system 320 is provided for directing the operation of the computer system 200. Software system 320, which is stored in system memory 202 and on persistent storage (e.g., disk memory) 207, includes a kernel or operating system (OS) 340 and a windows-based shell 350. One or more application programs, such as client application software or "programs" 345 may be "loaded" (i.e., transferred from storage 207 into memory 202) for execution by the system 200.

System 320 includes a user interface (UI) 360, preferably a Graphical User Interface (GUI), for receiving user commands and data. These inputs, in turn, may be acted upon by the system 200 in accordance with instructions from operating system (OS) module 340, windows shell 350, and/or application module(s) 345. The UI 360 also serves to display the results of operation from the OS 340, windows shell 350, and application(s) 345, whereupon the user may supply additional inputs or terminate the session. OS 340 and windows 350 can be provided by Microsoft® Windows 95, by Microsoft® Windows NT, or by Microsoft® Windows 3.x(operating in conjunction with MS-DOS); these are available from Microsoft Corporation of Redmond, Wash. Alternatively, OS 340 and windows 345 can be provided by IBM OS/2 (available from IBM of Armonk, N.Y.) or Macintosh OS (available from Apple Computers of Cupertino, Calif.). Although shown conceptually as a separate module, the UI is typically provided by interaction of the application modules with the windows shell, both operating under OS 340.

As shown, one application module of the system 200 comprises a cryptographic system or cryptosystem 325. The cryptographic system, which is implemented in the commercial embodiment of PGP for Personal Privacy, Version 5.5 for Windows 95/NT (available from Pretty Good Privacy, Inc. of Santa Clara, Calif., at http://www.pgp.com), provides encryption of messages (e.g., e-mail, binary files, text (ASCII) files, or the like) for supporting secured communication between a sender and a recipient. For a general description of the system, see PGP for Personal Privacy, Version 5.5 for Windows 95/Windows NT: User's Guide (available for Pretty Good Privacy, Inc.). Additionally, the PGP 5.5 User's Manual is currently available on the Internet via FTP (File Transfer Protocol) at ftp://ftp.no.pgpi.com/pub/pgp/5.5/win95nt/PGP55win.pdf. The disclosure of the foregoing is hereby incorporated by reference.

Of particular interest herein, the cryptosystem 325 includes improved cryptographic methodology of the present invention, for providing automatic access to encrypted messages to an authorized party (e.g., sender's company) which is itself neither the sender or the recipient. Construction and operation of the cryptographic system, including operation of the improved cryptographic methodology of the present invention, will now be described in detail.

Cryptographic System with Key Recovery

A. General Cryptosystem Operation

At the outset, it is helpful to review the basic encryption/decryption methodology of the cryptosystem 325. Because the public key encryption process is much slower than conventional single-key encryption, the cryptosystem 325 combines elements of secret key (symmetric) cryptography with that of public key (symmetric) cryptography.

Figure 4:
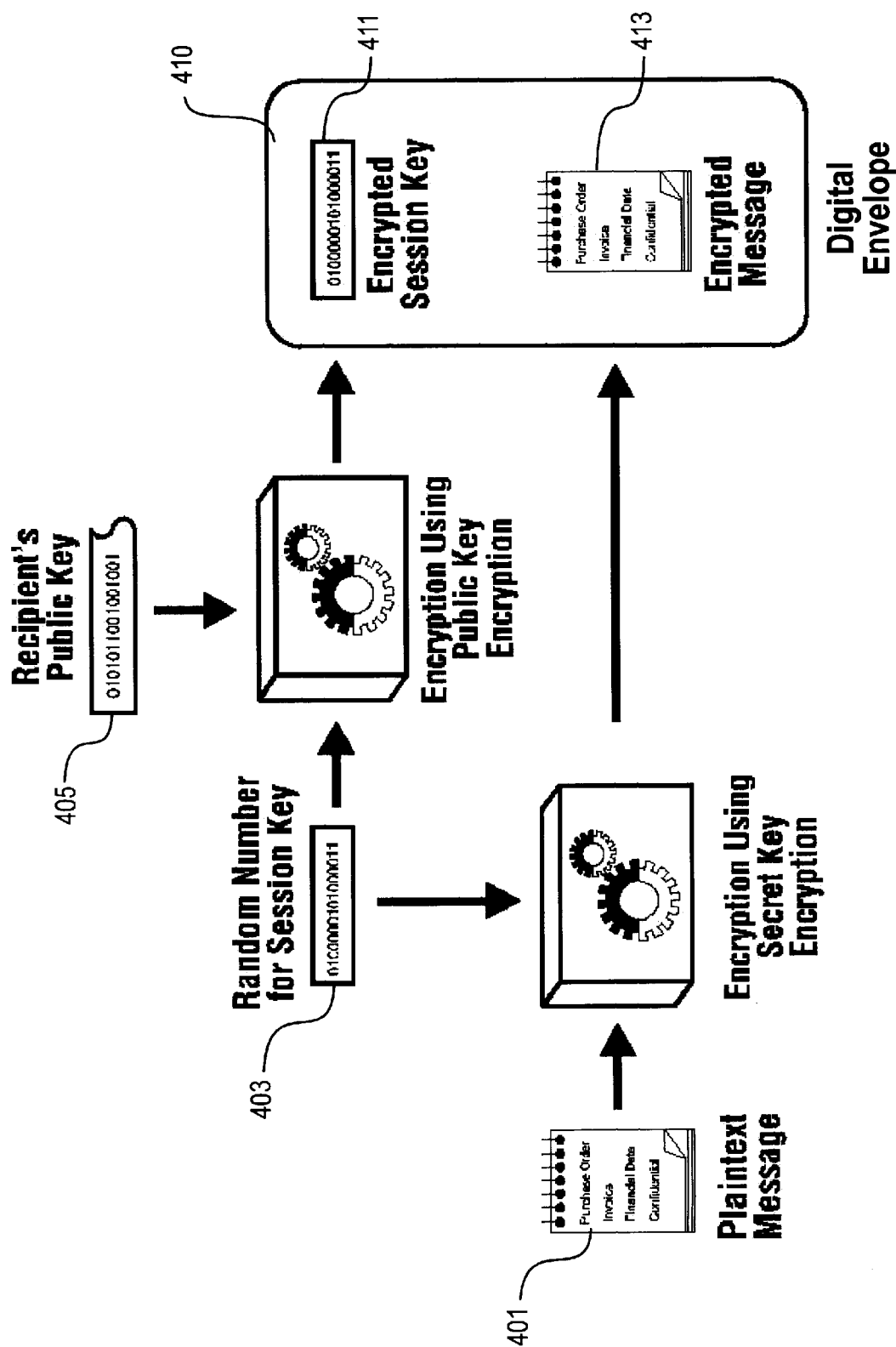
FIG. 4 is a block diagram illustrating basic encryption/decryption methodology of the cryptosystem of the present invention.

FIG. 4 illustrates the basic approach. A high-quality fast conventional secret-key encryption algorithm is used to encipher the original unenciphered message or "plaintext" 401. The actual "bulk" enciphering mechanism employed can be any symmetric algorithm, including for instance, CAST (Carlisle Adams and Stafford Tavares), IDEA (International Data Encryption Algorithm), Blowfish, DES, or DES variants (e.g., such as triple-DES)), DES with Independent Subkeys, DESX, CRYPT(3), Generalized DES, DES with Alternate S-Boxes, RDES, s" DES, and DES with Key-Dependent S-Boxes). See e.g., Bruce Schneier, *The IDEA Encryption Algorithm*, Dr. Dobb's Journal, December 1993; Bruce Schneier, *The Blowfish Encryption Algorithm*, Dr. Dobb's Journal, April 1994, pp. 38–40; and *Data Encryption Standard* (DES), as published by the National Bureau of Standards, Department of Commerce, FIPS, pub 46, January 1977, pp. 653–670. For a description of DES variants, see e.g., the abovementioned Applied Cryptography by Bruce Schneier. The disclosures of each of the foregoing are hereby incorporated by reference. The cryptosystem should generally employ an enciphering mechanism stronger than DES, such as CAST or IDEA.

As part of the foregoing process and in a manner transparent to the user, the cryptosystem 325 generates a temporary random key or "session key" 403—a key which is valid for the then-current session. In particular, the session key is used for enciphering the plaintext file, for creating an encrypted message or "ciphertext" 413. Then the recipient's public key, shown as key 405, is used to encipher this temporary random conventional key, for creating an encrypted session key 411. The public-key enciphered session key 403 together with the enciphered text 413 form a digital envelope 410 that is sent to the recipient.

To open the envelope and retrieve its message, the recipient must furnish his or her private key. The recipient does this by selecting his or her private key from a secured keyring, one which is itself protected by a passphrase. A corresponding installation of the cryptosystem at the recipient's site uses the private key to decrypt the encrypted session key. Once decrypted, the session key is used to decrypt the ciphertext, thus regenerating the original message for the recipient. Again, use of a session key at the recipient end is transparent to the recipient user.

With a basic understanding of the general operation of the cryptosystem 325, the reader has a foundation for understanding the modifications to the encryption/decryption process for implementing the key recovery methodology of the present invention. This methodology will now be described in detail.

B. Key Recovery Methodology

1. Message Recovery Agent (MRA)

A cryptosystem constructed in accordance with the present invention automatically provides an extra recipient (s) as each encrypted message is created. In an exemplary embodiment, the system is configured such that the extra recipient or "message recovery agent" (MRA)—an entity which itself has a public key (i.e., a "MRK" or "message recovery key," also referred to herein as an "ADK" or "additional decryption key")—is automatically added, under appropriate circumstances, as a valid recipient for an encrypted message created by a user. In a corporate setting, for example, the message recovery agent is the "corporate" message recovery agent designated for that company (firm, organization, or other group) and the user is an employee (or member) of that company (or group). During typical use, therefore, all messages created by the system automatically include the message recovery agent as an additional recipient.

During creation of an encrypted message, the public key of the message recovery agent is employed to create an encrypted copy of the random session key that is used to block-cipher encrypt the message. In a complementary manner, the private key of the message recovery agent can be used, if and when needed, to decrypt the session key, thus allowing decryption of the encrypted message. In this manner, the encrypted messages created by the system can be recovered by the company or organization authorized to act as the message recovery agent.

In the most preferred embodiment, the cryptosystem embeds a pointer (or other reference mechanism) to the MRA public key into the public key of the user or employee, so that encrypted messages sent to the company's employees from outside users (e.g., those individuals who are not employees of the company) can nevertheless still be recovered by the company. This constitutes a request by the intended recipient that the sender should encrypt with both keys. Alternatively, the MRA public key itself can be embedded within the data structure of the public key of the employee or user (i.e., a key within a key), but at the cost of increasing the storage requirements for the user's key. The functionality of the embedded pointer-to key is perhaps best explained by further developing the corporate-use example.

2. Message Recovery for Messages from Outside Recipients

In the example above, an encrypted message, such as e-mail, is readable by the company if the message is sent from one employee to another employee in the company. For instance, the each employee could be bound by company policy to add (or to employ a system which adds) the extra "corporate" recipient. A problem still presents itself as to how one can ensure that outside users will include (or at least be given the opportunity to include) the company's message recovery agent as a recipient.

In accordance with the present invention, the message recovery agent approach is employed to provide key recovery even for messages that originate outside the company. A message having a MRA recipient includes an extra field or MRA field within the digital envelope for storing a copy of the session key that has been encrypted with the public key of the extra recipient. When such a message gets to its destination, the recipient outside the company will not find any use for the extra field. Instead, he or she will decrypt the information packet available to that user using his or her own private key, for obtaining the session key and decrypting the message. From the perspective of the outside recipient, therefore, the MRA field (i.e., the copy of the session key that has been encrypted with the message recovery agent's public key) is simply an extra packet which can be ignored.

Even though this extra field is of no apparent use to the outside recipient, it still serves to afford access by the company. For instance, as the encrypted e-mail message is sent to the outside recipient, it is typically copied to a company's mail server. A persistent copy of the e-mail message might be available from a log of the server, or available from backup tapes employed to periodically backup the mail server. Even in the event that a copy of the encrypted message has not been kept by the company, a copy will nevertheless often be available from the recipient, including from the recipient's own computer, the mail server that the recipient employs to receive messages, or backup tapes employed to backup either machine. Even in the event of adverse parties, access may nevertheless be achieved through litigation and subsequent discovery procedures. Once the company obtains possession of the encrypted message, it can open or decrypt the message by using the extra field that contains the session key encrypted with the public key of the message recovery agent.

Consider, as another scenario, messages coming into the company from outside. The sender, since he or she is outside the company, is usually not bound by policies of the company. Further, the sender might not even have access to the public key of the company's message recovery agent (and probably does not want to be bothered to get it). This is addressed as follows. In accordance with the present invention, the public key for the message recovery agent is embedded in the recipient's key, such that the sender will encrypt the message with the recipient's public key but also encrypt the message with the corporate message recovery agent's key, in a manner transparent to the sender. In the preferred embodiment, the embedded key is created during the employee's or user's initial generation of a public/private key pair.

3. Generating Public/private Key Pair

In order to use the public key encryption cryptosystem, the employee and other users each generates a key pair. A key pair consists of two keys: a private key that only the employee possess and a public key that is freely distributed to those with whom he or she corresponds. As the key name implies, each user is the only one with access to his or her private key. The employee uses his or her private key to sign e-mail messages, file attachments, and other documents that the employee sends to others and to decrypt the messages and files that the employee has received. Conversely, the employee uses the public keys of others to send them encrypted mail and to verify their digital signatures. In accordance with the present invention, creation of the embedded key occurs after the employee or user generates his or her public/private key pair (e.g., when first beginning employment with the company) and by having the user digitally "sign" his or her own key for providing consent to inclusion of the MRA key.

Figure 5A:
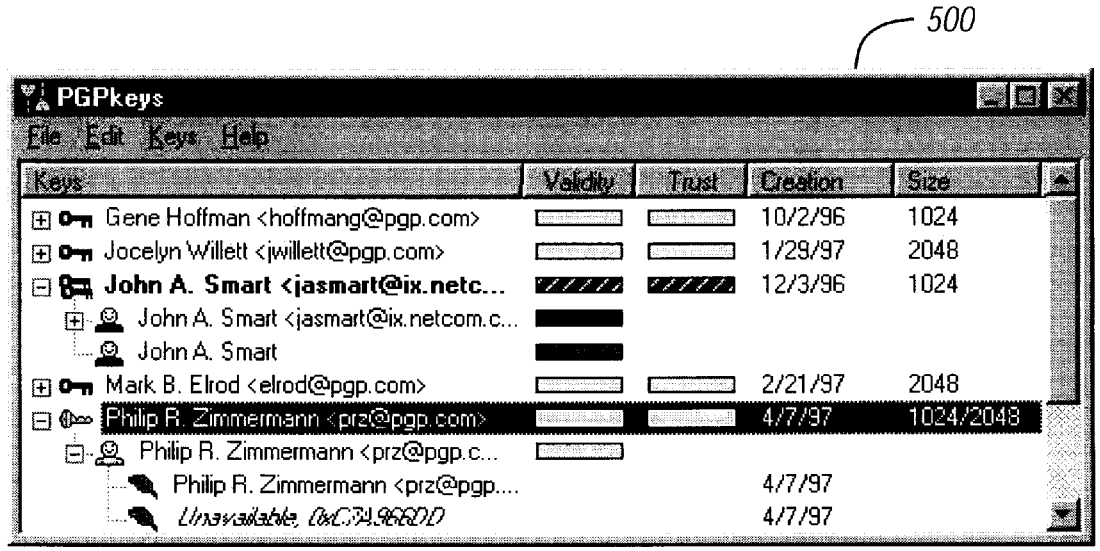
FIGS. 5A–L are bitmap screenshots illustrating key management and key pair generation.

FIGS. 5A–L illustrate key management and key pair generation. As shown in FIG. 5A, the system provides PGPkeys window 500 that displays an outline view of the user's keyrings. The PGPKeys window displays the user's own keys that the user has created as well as any public keys that the user has added to his or her public keyring. Double keys represent the private and public key pairs the user has created for himself or herself and single keys represent the public keys the user has collected from others. If more than one type of key is present, the system displays RSA-type keys in blue and DSS/Diffie-Hellman keys in yellow. For a description of RSA-type keys, see e.g., U.S. Pat. No. 4,405,829 (Sep. 20, 1983), entitled CRYPTOGRAPHIC COMMUNICATIONS SYSTEM AND METHOD. For a description of DSS/Diffie-Hellman keys, see e.g., U.S. Pat. No. 4,200,770 (Apr. 29, 1980), entitled CRYPTOGRAPHIC APPARATUS AND METHOD. The disclosures of each of the foregoing are hereby incorporated by reference. In response to the user double-clicking on any of the keys, the system expands the selected entries to reveal the user ID and e-mail addresses for the owner of the key as represented by the figure icons. By double-clicking a figure icon, the user can see the signatures of any users who have certified the key, as represented by a quill icon.

Along the top of the window are labels that correspond to the attributes associated with each key.

| | |
|---|---|
| Keys | Shows an iconic representation of the key along with the user name and e-mail address of the owner. |
| Validity | Indicates the level of confidence that the key actually belongs to the alleged owner. The validity is based on who has signed the key and how well the user trusts the signer(s) to vouch for the authenticity of a key. The public keys the user signs himself or herself have the highest level of validity, based on the assumption that the user will only sign someone's key if he or she is totally convinced that it is valid. The validity of any other keys, which the user has not personally signed, depends on the level of trust the user has granted to any other users who have signed the key. If there are no signatures associated with the key, then it is not considered valid and a message indicating this fact appears whenever the user employs the key. |
| Trust | Indicates the level of trust the user has granted to the owner of the key to serve as an introducer for the public keys of others. This trust comes into play when the user is unable to verify the validity of someone's public key for himself or herself and instead elects to rely on the judgement of other users who have signed the key. When the user receives a public key from someone that has been signed by another of the user's keys on the user's public keyring, the level of authenticity is based on the trust the user has granted to the owner of that key. When the user creates a set of keys, they are considered implicitly trustworthy, as represented by striping in the trust and validity bars. The user assigns a level of trust (either Complete, Marginal or Untrusted) in a "Properties" dialog box. |
| Creation | Shows the date when the key was originally created. The user can sometimes make an assumption about the validity of a key based on how long it has been in circulation. If the key has been in use for a while, it is less likely that someone will try to replace it because there are many other copies in circulation. |
| Size | Shows the number of bits used to construct the key. Generally, the larger the key, the less chance that it will ever be compromised. However, larger keys require slightly more time to encrypt and decrypt data than do smaller keys. When the user creates a DSS/Diffie-Hellman key, there is one number for the DSS portion and another number for the Diffie-Hellman portion. |

Figure 5B:
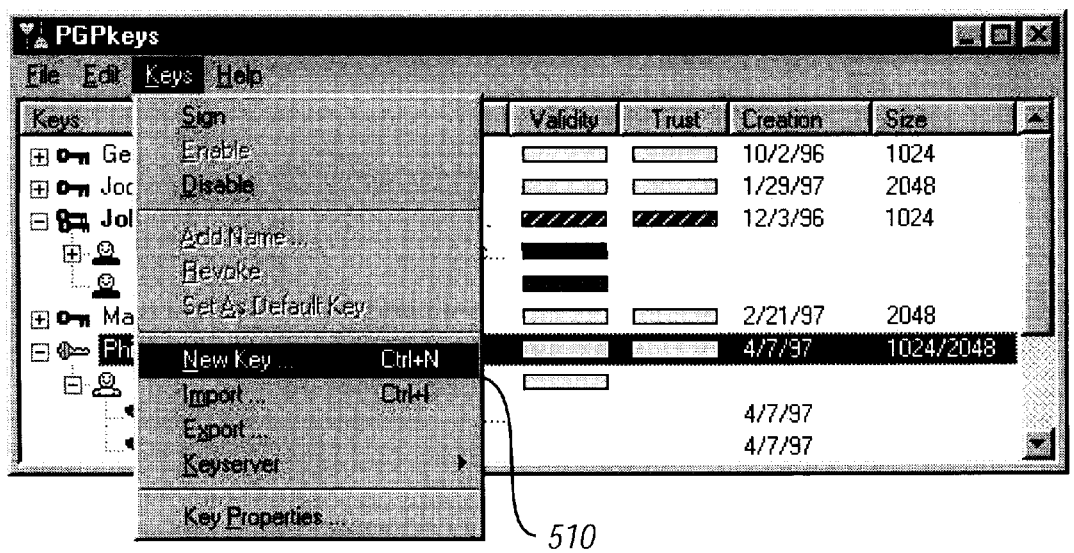
Figure 5C:
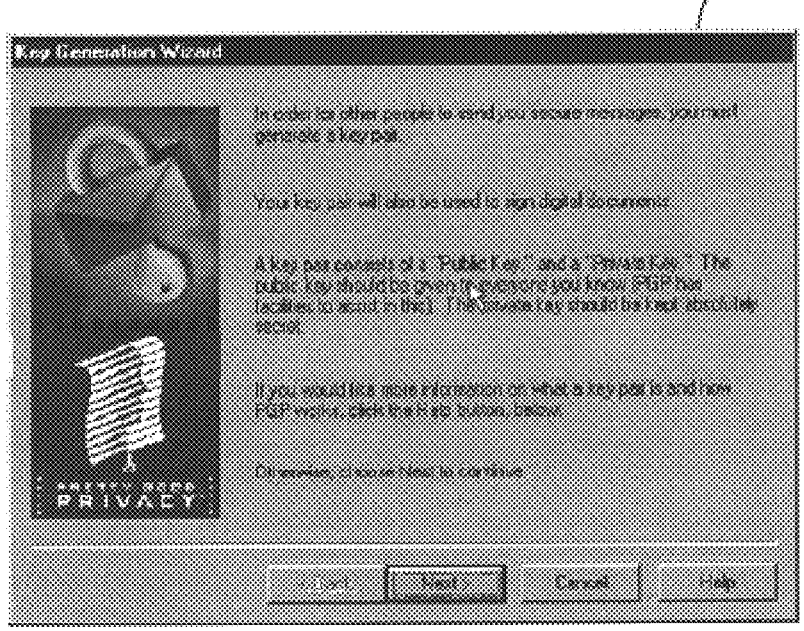

From the PGPkeys window 500, the employee or user can generate a new key pair from a using a Key Generation Wizard that guides the user through the process. Specifically, the Key Generation Wizard is invoked by selecting a "New Key" menu choice 510 from the PGPkeys window, as shown in FIG. 5B. In response, the system displays Key Generation Wizard 520, as FIG. 5C illustrates.

Figure 5D:
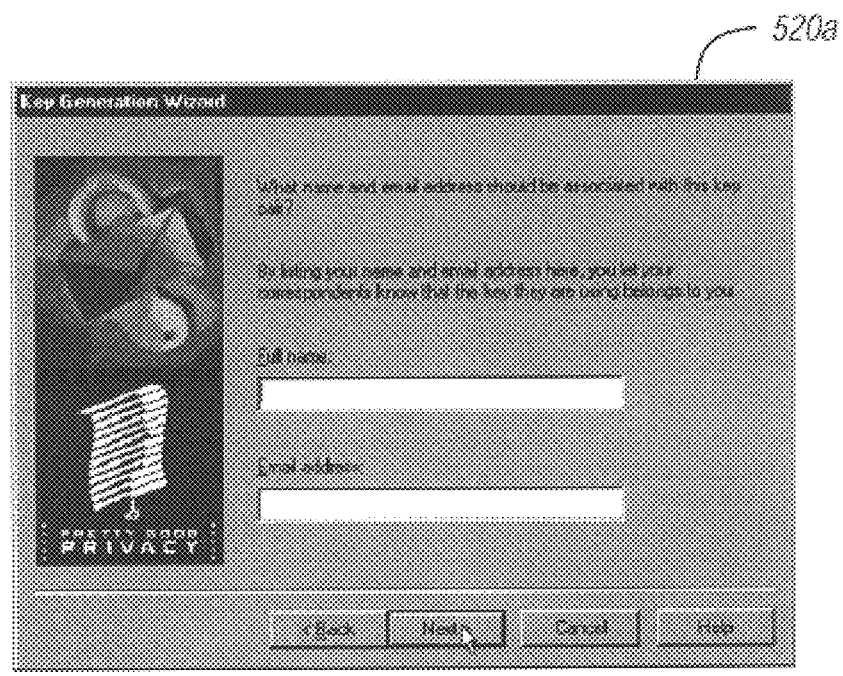
Figure 5E:
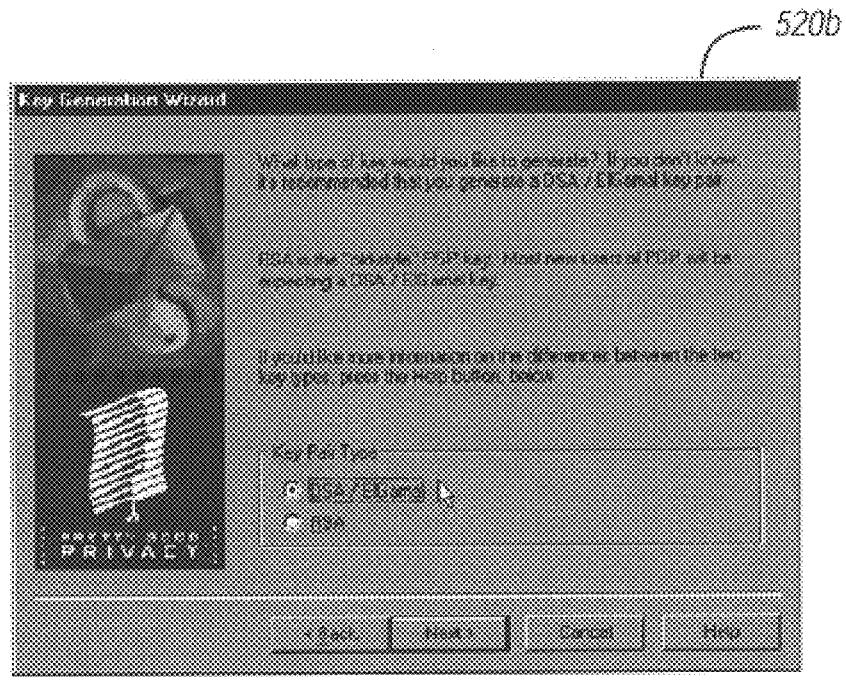

At the outset, the Key Generation Wizard 520 provides some introductory information on its opening page or pane. The user proceeds by clicking the "Next" button to advance the dialog to the next dialog page. In response, the system displays a new page for the Key Generation Wizard (now 520a), as FIG. 5D illustrates. Here, the Key Generation Wizard asks the user to enter his or her user name and e-mail address. The user clicks "Next" to advance to the next dialog box, which is shown in FIG. 5E. The Key Generation Wizard (now 520b) then asks the user to choose a key type: either DSS/Diffie-Hellman or RSA.

Figure 5F:
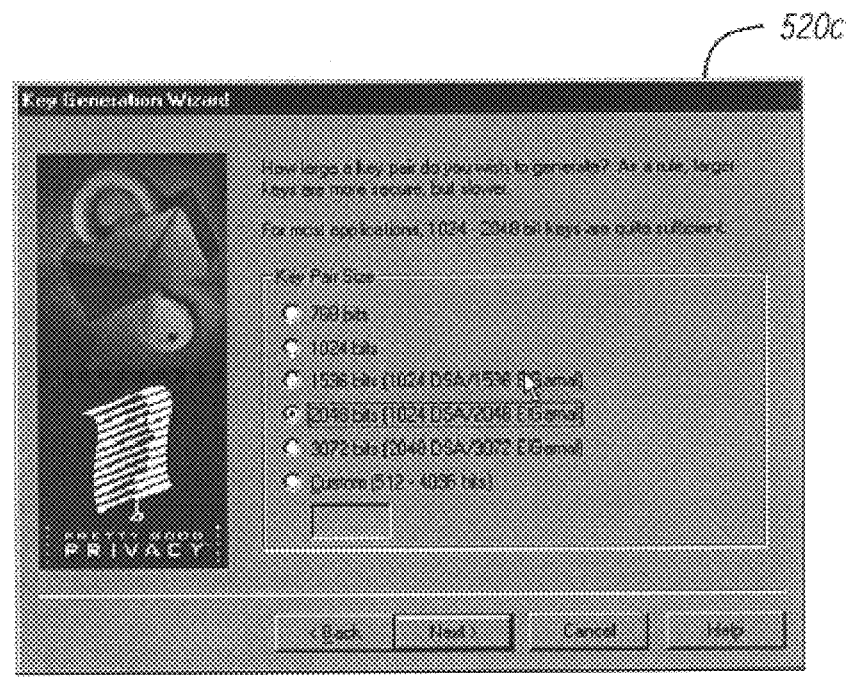

The user clicks Next to advance to the next dialog box, which is shown in FIG. 5F. Key Generation Wizard (now 520c) asks the user to specify a size for the new keys. The user can select a key size (from 768 to 3072) or enter any key size from (from 768 to 4096). RSA keys are limited to 2048 bits in order to maintain compatibility with older versions of the system. The key size corresponds to the number of bits used to construct the digital key. The larger the key, the less chance that someone will ever be able to crack it, but the longer it will take to perform the decryption and encryption process.

Figure 5G:
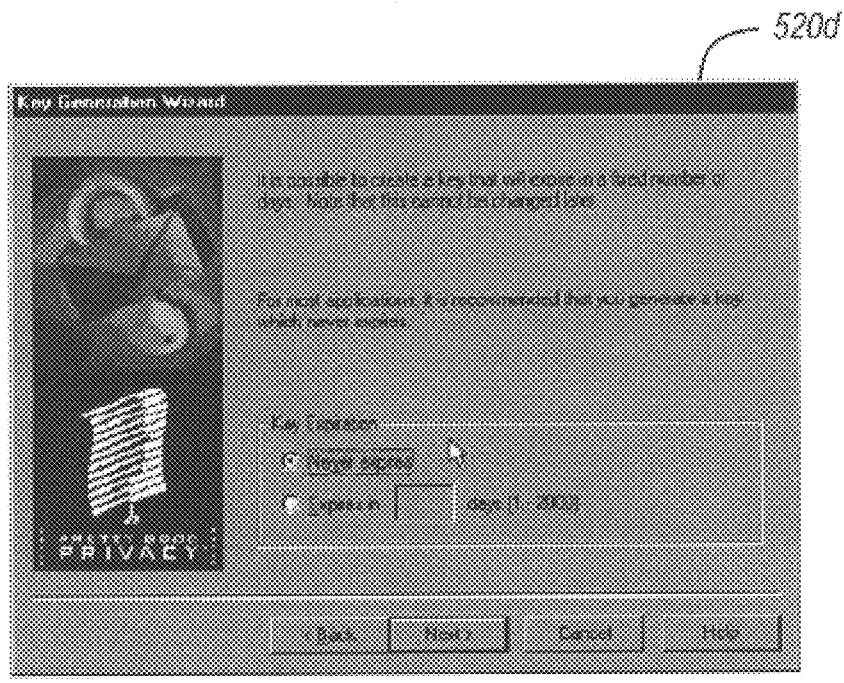

The user clicks Next to advance to the next dialog box. As shown in FIG. 5G The Key Generation Wizard (now 520d) asks the user to indicate when the key pair should expire. Here, the user indicates when the keys should expire. The user can select either the default selection which is "never", or can enter a specific number of days after which the keys will expire. For the latter, the user may want to create a special set of keys that he or she plans to use for a limited period of time. In this case, when the public key expires it can no longer be used by someone to encrypt mail for the user but it can still be used to verify his or her digital signature. Similarly, when the private key expires, it can still be used to decrypt mail that was sent to the user before the public key expired; it can no longer be used to sign mail for others, however.

Figure 5H:
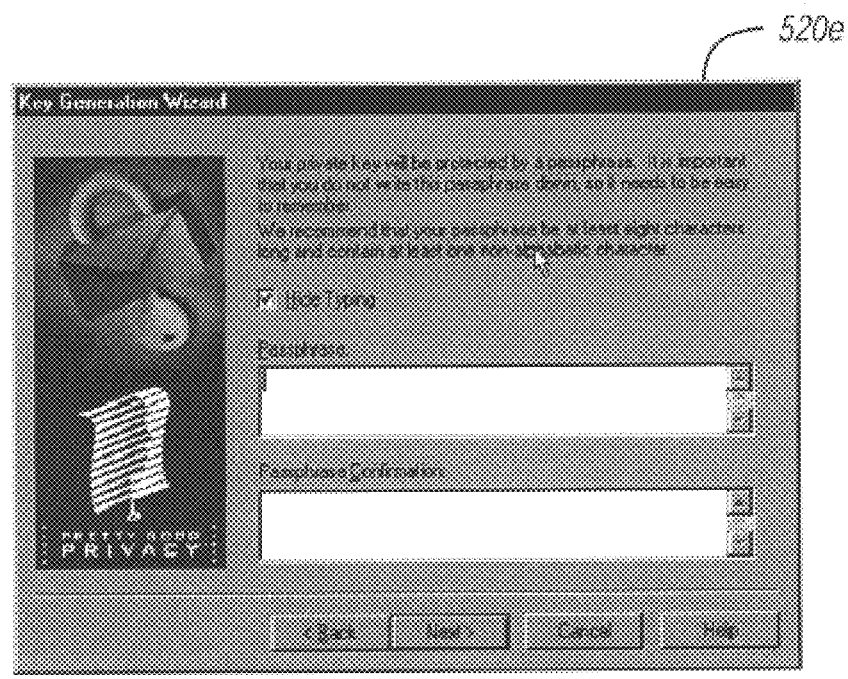

The user clicks Next to advance to the next dialog box. As shown in FIG. 5H, the Key Generation Wizard (now 520e) asks the user to enter a passphrase. In the "Passphrase" entry box, the user enters the string of characters or words he or she wants to use to gain exclusive access to the user's private keys. A passphrase should generally contain multiple words and may include spaces, numbers, and other printable characters. The longer the passphrase, and the wider the variety of characters it contains, the more secure it is.

Figure 5I:
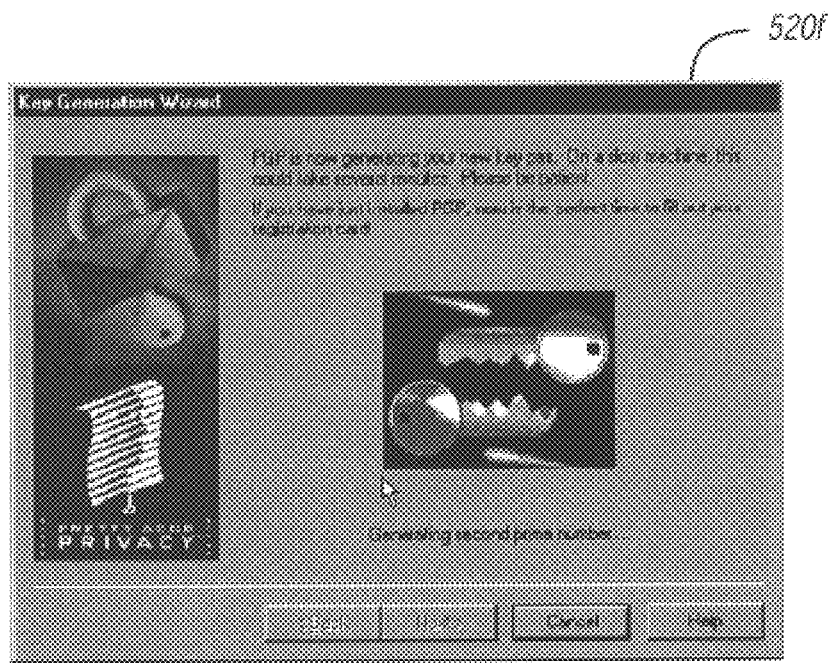
Figure 5J:
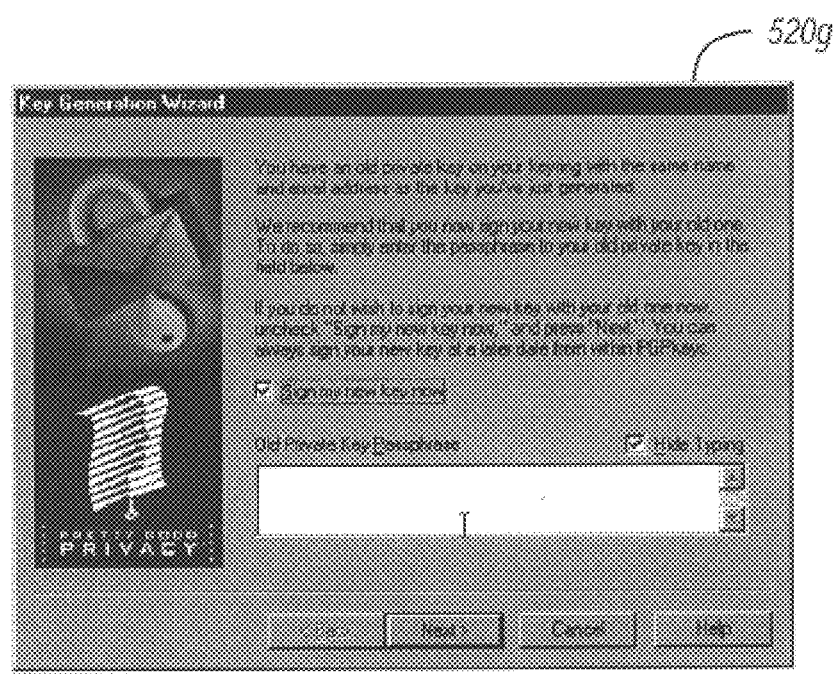

The user clicks Next to advance to the next dialog box. As shown in FIG. 5I, the Key Generation Wizard (now 520f) has begun the key generation process. When done with this step, the Key Generation Wizard indicates that the actual key generation has occurred. The user clicks Next to advance to the next dialog box. As shown in FIG. 5J, the Key Generation Wizard (now 520g) gives the user the opportunity to sign the new key. The user can, for instance, sign the new key with the user's older key. This is helpful when the user is creating a key with the same user name or e-mail address as a previous key. If the user is creating a new key pair for use in the user's capacity as an employee, however, the user can sign his or her new key, whereupon the system embeds the (pointer to) MRA key for the user's company (as described in further detail below).

Figure 5K:
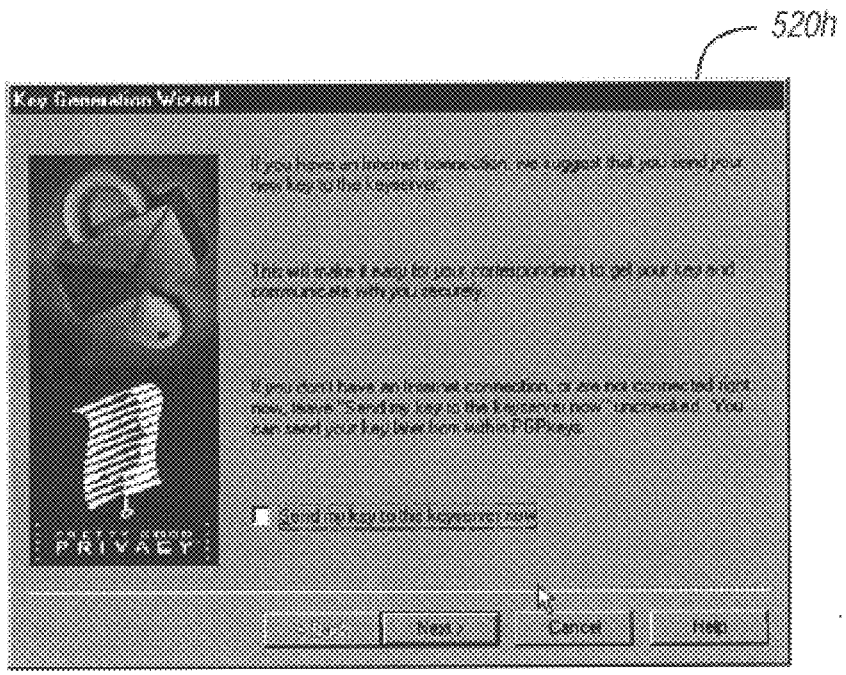

The user clicks Next to advance to the next dialog box. As shown in FIG. 5K, the Key Generation Wizard (now 520h) indicates that the user has successfully generated a new key pair and asks the user whether to send the newly-created public key to a public key server. By sending your public key to the key server, anyone will be able to get a copy of your key when they need it. After specifying whether the new public key should be sent to a key server, the user clicks Next.

Figure 5L:
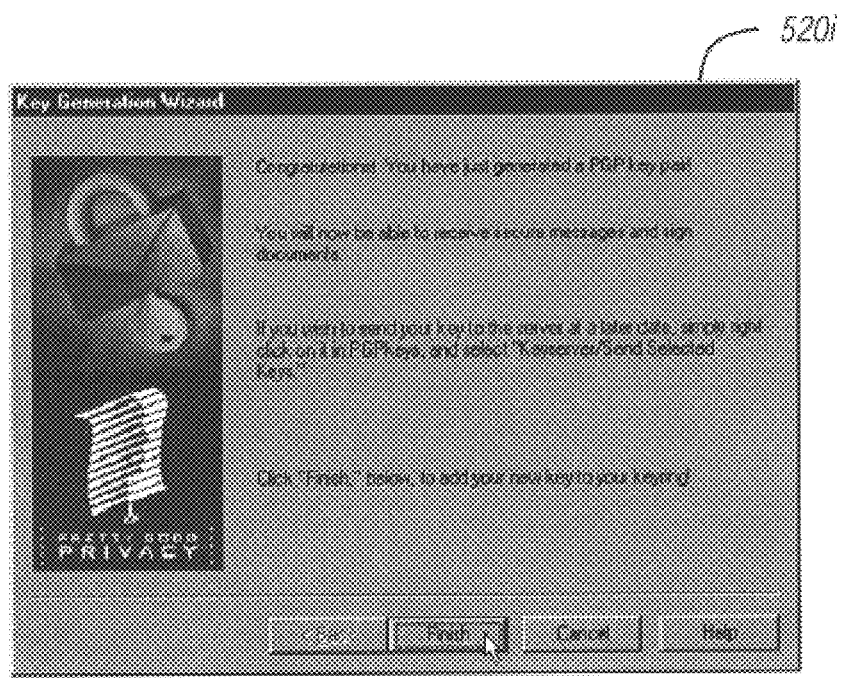

Now, the Key Generation process is complete, and the final wizard dialog box (shown at 520i) appears, as shown in FIG. 5L. A pair of keys representing the newly-created keys appears in the PGPkeys window, with RSA keys shown in blue and DSS/Diffie-Hellman keys shown in yellow. At this point, the user can examine the keys by checking their properties and the values associated with them. The user can modify the values, if desired (e.g., to add other user names or e-mail addresses).

4. Embedding the MRA Key (pointer)

During the key generation process, the user can specify various assertions about the key pair, such as an expiration date (if any). Internally, such attributes are embedded within a key by hashing the attributes into the key's signature or ID. This approach is also employed to embed the MRA key. More particularly, in accordance with the present invention, a pointer (or other reference) to the key of the message recovery agent can, if consented to by the user, also be hashed into the signature. At the conclusion of generating a new key pair, for example, the employee or user will have signed the key pair with a digital signature which includes a hashed value identifying the key for the message recovery agent of the employee's company. In essence, this hash for the user's key points to the public key of the message recovery agent.

By the employee signing his or her key this way, the employee is also providing consent for inclusion of the (pointer to) public key of the message recovery agent. The semantics for this consent are conceptually as follows: I hereby give my consent to have my e-mail be also readable by the message recovery agent which I have designated. Through the digital signature process, the employee, in essence, anoints a particular message recovery agent as being suited for being able to sometimes read the employee's messages.

When the employee publishes his or her public key (e.g., by posting it to a key server), he or she also publishes a copy of the corporate message recovery agent's public key. When the public key is downloaded from the key server, a copy of the corporate message recovery agent's key is also downloaded. The key server can provide the additional key either automatically (i.e., automatically download the MRA key) or manually (i.e., require a request or acknowledgment before the key is downloaded). In this manner, when an outside user sends a message to the employee, the sender is given the opportunity of adding an extra recipient (i.e., the message recovery agent), even though the message is not being sent from within the company. Since the message recovery agent's key has, in effect, traveled along with the employee's key, the corporate message recovery agent is provided as an extra recipient in an automated manner—without requiring intervention by the sender.

The actual "pointer" or reference to the recovery agent's public key can be achieved by any unambiguous means for referencing the key. In the currently preferred embodiment, a cryptographic hash of the key, such as a Message Digest (e.g., Secured Hash Algorithm (SHA), or less-preferably MD5), is preferably employed, for preventing substitution of the key (or other tampering). For a discussion of cryptographic hashes, including SHA and MD5, see e.g., the abovementioned *Applied Cryptography* by Bruce Schneier. The disclosures of each of the foregoing are hereby incorporated by reference. The general methodology of the present invention itself does not depend on use of a hash as (or as part of) the signature or ID. By employing a cryptographic hash or Message Digest, however, tampering is prevented, since it is computationally infeasible (given current and foreseeable hardware) to generate a key which would hash to the same ID or signature.

As a further refinement, in the currently preferred embodiment the MRA hash includes a set of user-supplied strictness criteria, for allowing the sender to specify the recipient's use of the key. For example, the sender could specify that all response messages should preferably include or must include the message recovery agent as a co-recipient. The strictness criteria can specify further preferences, such as requiring use of the message recovery agent for business-related messages.

Although the currently preferred embodiment employs a pointer to the message recovery agent's public key, those skilled in the art, enabled by the teachings herein, will appreciated that the actual MRA key itself may be embedded as an assertion to the employee's signed key. In this manner a download of the employee's key would automatically include a copy of the message recovery agent's key. In a preferred embodiment, however, it is preferable to simply include a pointer to the key, thereby reducing the storage requirements of the employee's key (as each copy is about 2,000 bits or more in length).

5. Automated Use of the MRA Key by an Outside User

Figure 6A:
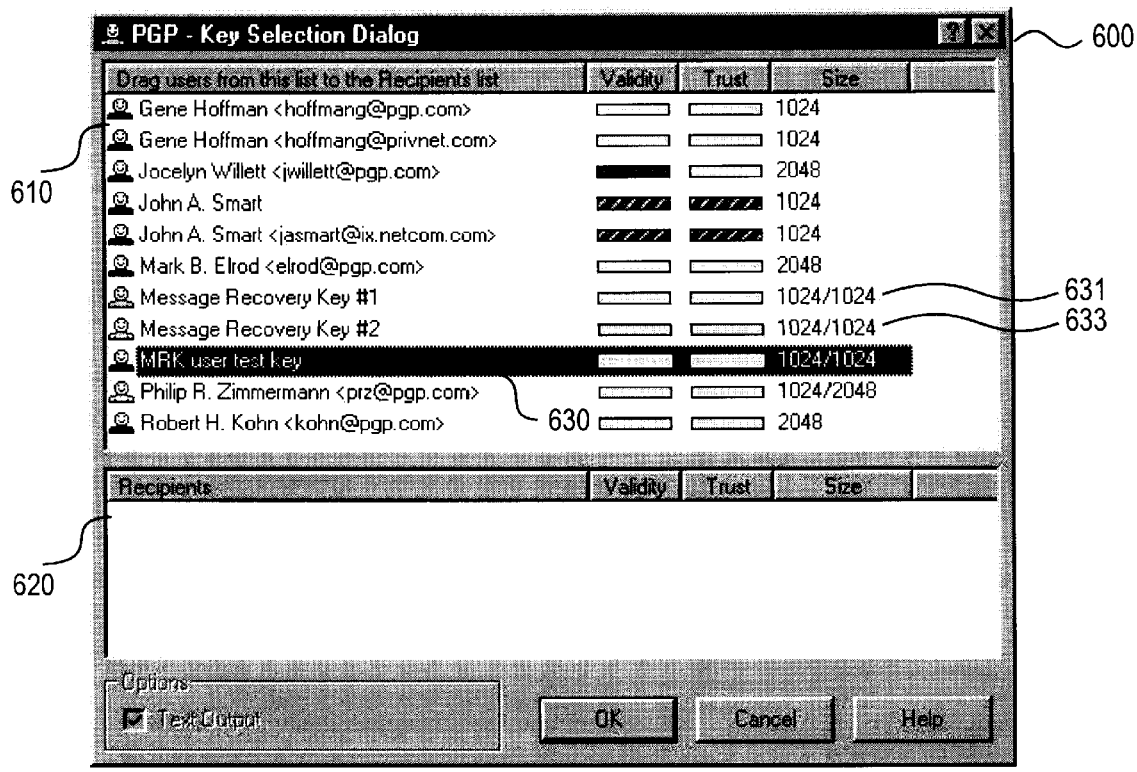
FIGS. 6A–F are bitmap screenshots illustrating automated use of the MRA key (MRK) by an outside user.

With reference to FIG. 6A, automated use of the MRA key by an outside user will now be described. Interface 600 is employed for creating and sending encrypted messages. At its top half, the interface 600 includes a list of keys 610. This list represents keys on a user's keyring (e.g., a local directory or a company wide directory of keys). At its bottom half, the interface includes a recipient list 620. The recipient list 620 indicates the intended recipient for the encrypted message. In response to the user selecting a key (e.g., the user double clicking on a key with a mouse), the system in turn selects the key and "teleports" the key to the recipient list 620.

Figure 6B:
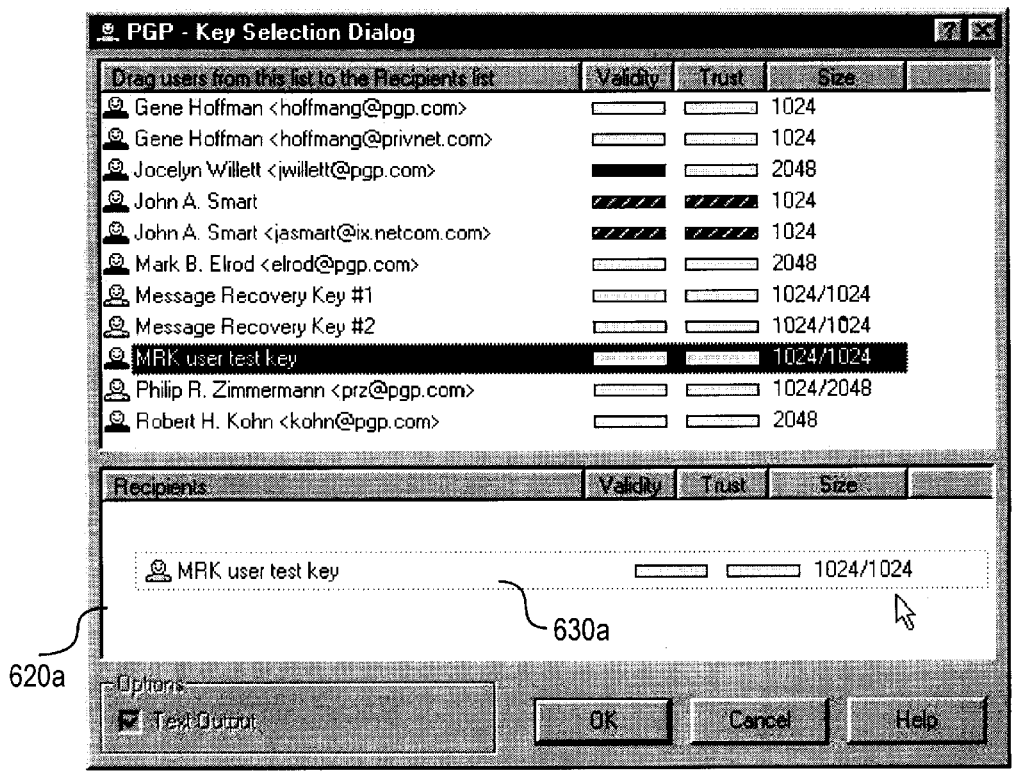
Figure 6C:
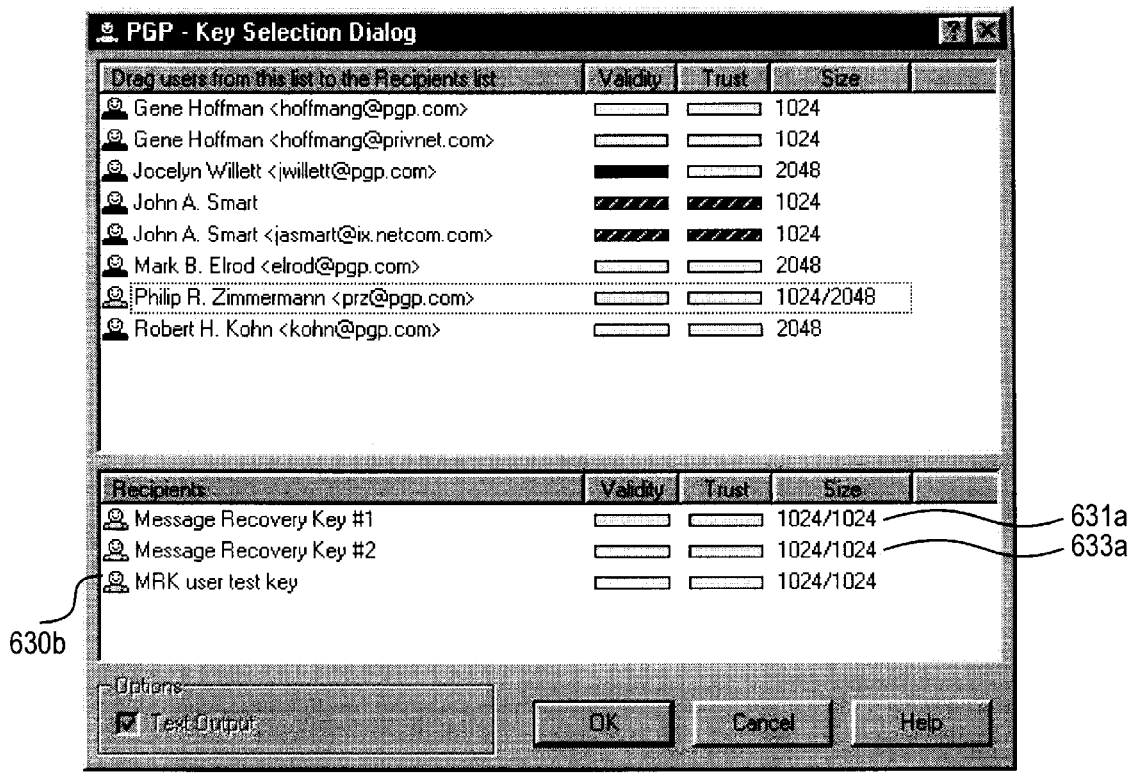
Figure 6D:
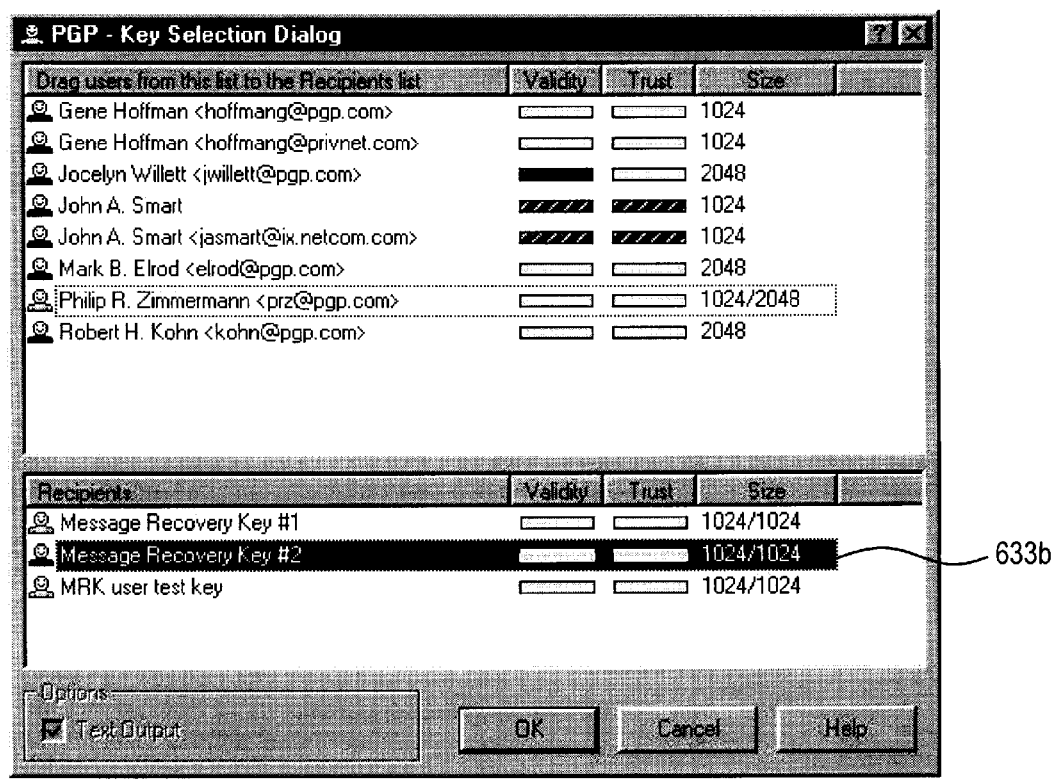

In the event that a key in the list of keys 610 is one associated with a message recovery agent, such as MRK user test key 630, additional key(s) will appear in the list. For MRK user test key 630, for instance, Message Recovery Key #1 (631) and Message Recovery Key #2 (633) are also displayed, as shown. Message Recovery Key #1 is an optional message recovery key. Message Recovery Key #2, on the other hand, is a mandatory message recovery key—that is MRK user test key 630 specifies a policy requiring user of the message recovery key. Now, when the MRK user test key 630 is selected for adding the user as an intended recipient, the key(s) of the message recovery agent are also added. This action is illustrated in FIGS. 6B–C, by the user "dragging" and "dropping" key 630. FIG. 6B illustrates the MRK user test key 630 (shown at 630a) being "dragged"

over to the recipient list 620 (shown at 620a), using a mouse device. Upon the user "dropping" the MRK user test key, the MRK user test key (shown at 630b) appears in the recipient list together with keys of the associated message recovery agent: Message Recovery Key #1 (shown at 631a) and Message Recovery Key #2 (shown at 633a).

In the currently preferred embodiment, this multi-key user interface approach is employed to inform the user that the message will be encrypted also for the corporate message recovery recipient or agent, in addition to any other recipient which the user has added to the recipient's list 620. Here, the user (sender) is informed of the automatically added additional recipient (i.e., corporate message recovery agent), as if the user had manually added that recipient key to the recipient list 620. The user can continue to add other recipients to the recipient list. Some of those recipients can, in turn, include automatic additional recipients or corporate recovery agent keys, which are the same as and/or different from the corporate recovery agent key previously added by the system.

Figure 6E:
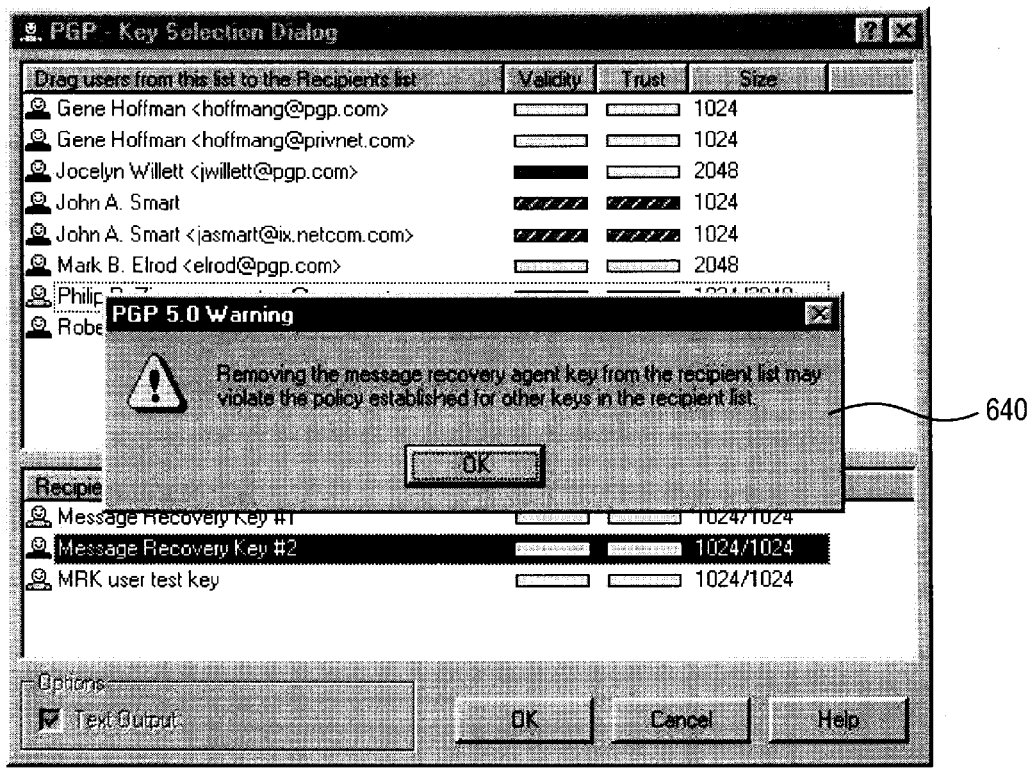
Figure 6F:
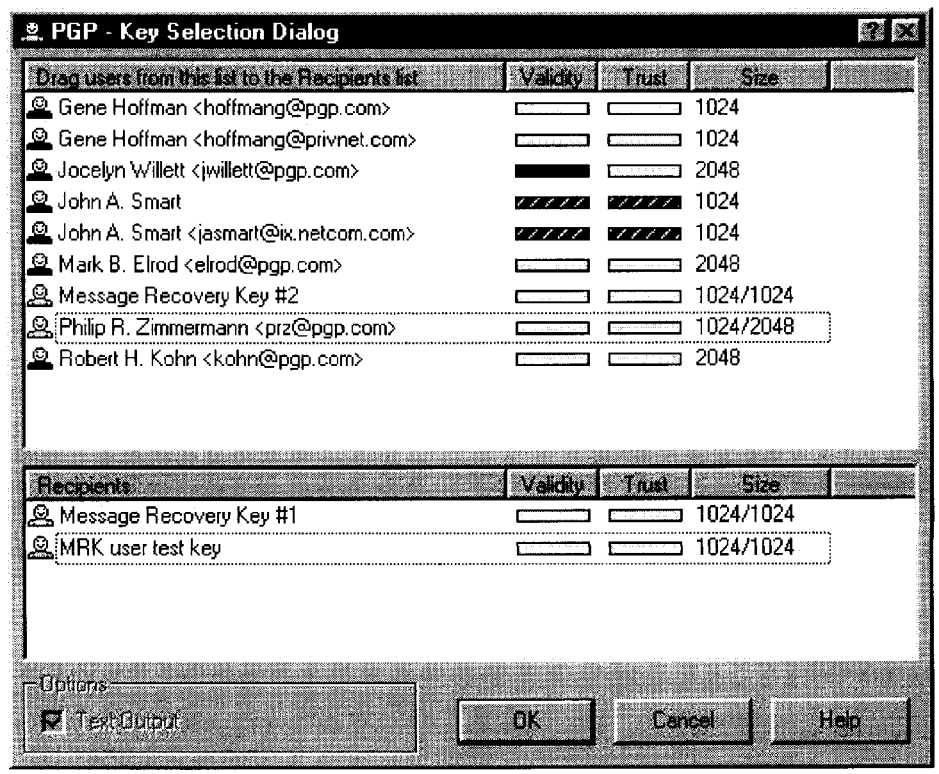

In the currently preferred embodiment, the user or sender is given the flexibility to delete any key from the recipient list, including even mandatory message recovery keys. In FIG. 6E, for example, the user selects Message Recovery Key #2 (shown at 633b) for deletion. Upon the user invoking "Delete" for this mandatory key, the system first warns the user that the requested deletion might violate a policy established by other keys in the recipient list, by displaying Warning dialog 640. Nevertheless, the user may proceed, whereupon the message recovery key is removed from the list, as shown in FIG. 6F. In a like manner, if desired at this point, the user can delete the other message recovery key as well. Since the other key is an "optional" key, no warning dialog would be shown.

Those skilled in the art will appreciate that the foregoing interface can easily be adapted such that this user option is not provided (or that the user is not even shown that such keys are being added). Although the user might desire to delete recovery keys from personal messages, the user will still nevertheless oftentimes very much want the recovery key included, such as when the user is transacting company business (e.g., transmitting a purchase order to another company).

6. Summary of Methodology

Figure 7:
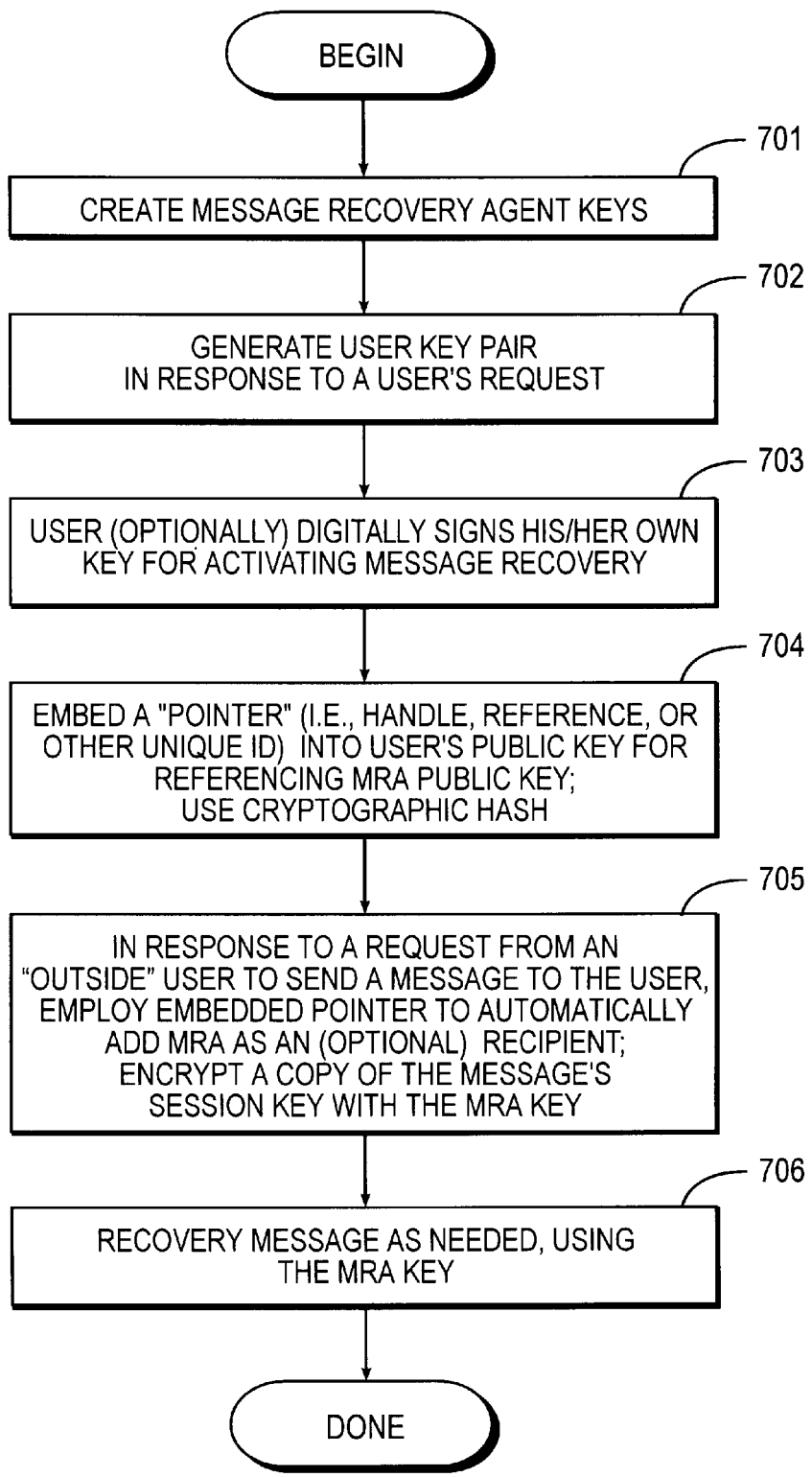
FIG. 7 is a flowchart illustrating a method of the present invention providing a recovery key for use in recovering a message which has been encrypted.

Referring now to FIG. 7, a method for message recovery using a recovery key may be summarized as follows. At step 701, at least one message recovery agent's public key(s) (i.e., public key of the MRK pair) is created for the cryptosystem, so that users of the system can selectively embed (a pointer to) the recovery key during generation of the user's key pair; the corresponding private key for the MRA (public) key is also conveniently generated at this point. Typically, the MRA key will be that of a particular company. If desired, generation of the MRK can be deferred until such times as the public key of the MRK is actually referenced (e.g., from a public key being generated for a newly-hired employee). At step 702, the system generates a key pair in response to a user's request. At shown at step 703, the user is prompted to (optionally) activate message recovery by digitally signing his/her own key, for the specific purpose of consenting to embedding the MRA key within the user's own key. In response to the user providing such consent, the cryptosystem embeds a "pointer" (i.e., handle, reference, or other unique ID), at step 704, into user's public key for referencing MRA public key. Typically, this step is performed using a cryptographic hash or message digest, for guarding against tampering. Although less space-efficient, the MRA key itself can be embedded, if desired.

The underlying data structure supporting key creation at this point is a "signature specification" data structure, which may be defined as follows.

```
/*
The following is the data structure used to create a key; the fields
labelled "havekdecryption" and "kdecryption" determine whether it has a
recovery key associated with it.
*/
struct PGPSigSpec {
    PGPContextRef       cdkContext;
    PGPSigSpec *next;
    PGPSecKey *seckey;
    PgpVersion version;
    PGPByte hashtype;
    PGPBoolean exportable;
    PGPBoolean exportableHashed;
    PGPBoolean revokable;
    PGPByte extra[5];            /* I know this is 5 bytes now! */
    PGPUInt32 sigExpiration;     /* Timestamp for sig to expire */
    PGPByte trustLevel;          /* 0 for regular, 1 for trust,
                                    > for meta */
    PGPByte trustValue;          /* if trustLevel > 0 */
    PGPBoolean hasRegExp;
    char regExp[MAXREGEXP];
    /* Next ones are only used on key self-sigs */
    PGPUInt32 keyExpiration;       /* Timestamp for key to expire. */
    PGPByte prefAlgs[20];          /* Preferred algorithms */
    PGPByte havekdecryption[NR];   /* True if kdecryption has
                                      been set */
    PGPByte kdecryption[NR] [22];  /* Key additional decryption
                                      information
*/
    PGPByte havekrevocation[NR];   /* True if krevocation has
                                      been set */
    PGPByte krevocation[NR] [22];  /* Key revocation information */
    DEBUG_STRUCT_CONSTRUCTOR( PGPSigSpec )
};
```

The last two fields of the data structure indicate whether the created key has a recovery key associated with it. Here, havekrecovery serves as a Boolean for indicating whether the current key has an associated message recovery key. Information about the message recovery key itself is stored by Krecovery, a byte array.

Step 705 illustrates that, in response to a request from an "outside" user to send a message to the user (i.e., adding the user's key to a recipient list), the MRA is automatically added as an optional recipient. Here, the system finds the message recovery key subpacket, then performs a look-up operation to see whether there exists a corresponding key.

```
/*
* Find an additional decryption key for the given key, if one exists.
* nth tells which one to find. *pkeys is set to the number of add'l
* decryption keys, *pclass is set to the class byte associated with
* the decryption key. *pkalg and *keyid are set to the algorithm and
* keyid of the nth ADK key. Returns NULL but no error in *error if
* the ADK key is not in the specified ringset. Return *error as
```

-continued

```
* kPGPError_ItemNotFound if there are fewer than n + 1 ADKs.
*/
union RingObject *
ringKeyAdditionalRecipientRequestKey (RingObject *obj, Ringset const *set,
    unsigned nth, PGPByte *pkalg, PGPKeyID *keyid,
    PGPByte *pclass, unsigned *pkeys, PGPError *error)
{
    RingObject    *rkey;         /* Additional decryption key */
    PGPByte const *krpdata;      /* Pointer to key decryption data */
    PGPSize       krdatalen;     /* Length of krdata */
    int           critical;      /* True if decryption field was critical */
    unsigned      matches;       /* Number of adk's found */
    PGPByte       fingerp[20];   /* Fingerprint of adk */
    PGPByte       krdata[22];    /* Copy of key decryption data packet */
    pgpAssert (OBJISKEY (obj));
    pgpAssert (pgpIsRingSetMember (set, obj));
    pgpAssert (error);
    *error = kPGpError_NoErr;
    if( IsntNull( pkeys ) )
            *pkeys = 0;
    if( IsntNull( pclass ) )
            *pclass = 0;
    if( IsntNull( pkalg ) )
            *pkalg = 0;
    if( IsntNull( keyid ) )
            pgpClearMemory( keyid, sizeof( *keyid ) );
    }
    krpdata = ringKeyFindSubpacket (obj, set,
            SIGSUB_KEY_ADDITIONAL_RECIPIENT_REQUEST, nth, &krdatalen,
            &critical, NULL, NULL, &matches, error);
    if (!krpdata) {
            if (IsntPGPError(*error))
                    *error = kPGPError_ItemNotFound;
            return NULL;
    }
    /*
    * krdata is 1 byte of class, 1 of pkalg, 20 bytes of fingerprint.
    * Last 8 of 20 are keyid. Make a copy because data is volatile when
    * we do other operations.
    */
    if (krdatalen < sizeof(krdata)) {
            /* malformed packet, can't use it */
            *error = kPCPError_ItemNotFound;
            return NULL;
    }
    pgpCopyMemory (krpdata, krdata, sizeof(krdata));
    /* Do we have ADK? */
    rkey = ringKeyById8 (set, krdata[1], krdata + 2 + 20 - 8);
    if (IsntNull (rkey)) {
            if (pgpVirtMaskIsEmpty(&rkey->g.mask)) {
                    rkey = NULL;
            } else {
                    ringKeyFingerprint20 (set, rkey, fingerp);
                    if (memcmp (fingerp, krdata + 2, 20) != 0) {
                            /* Have a key that matches in keyid but wrong fingerprint
                            rkey = NULL;
                    }
            }
    }
    /* Success */
    if (pkeys) {
            *pkeys = matches;
    }
    if (pclass) {
            *pclass = krdata[0];
    }
    if (pkalg) {
            *pkalg = krdata[1];
    }
    if (keyid) {
            pgpNewKeyIDFromRawData( krdata + 2 + 20 - 8, 8, keyid );
    }
    return rkey;
}
```

Applications can call the system to return the message recovery keys associated with a given key, as illustrated below.

```
/*  Return the nth (0 based) additional decryption key and keyid,
    if one exists.
    It is an error to use an index >= K,
    where K is the number of ARR key ids.
    Also return the class of the ADK. The class is currently reserved
    for use by PGP.
    Any of the return pointers may be NULL.
    Note that it is *not* safe to use the keyID returned from this function
    to get the ADK to use because KeyIDs are not unique.
    Instead, the keyID can be used to locate the actual key(s) with that
    key id.
    Then call this function again to get the ADK;
    it will check the key fingerprint, which is unique.
/*
    static PGPError
pgpGetIndexedAdditionalRecipientRequestKey(
    PGPKeyRef       basekey,
    PGPKeySetRef    allkeys,
    PGPUInt32       nth,
    PGPKeyRef*      adkey,
    PGPKeyID *      adkeyid,
    PGPByte *       adclass)
{
    RingSet const    *ringset;   /* Aurora ringset to look in */
    union RingObject *keyobj;    /* Aurora base key */
    union RingObject *rkey;      /* Aurora additional decryption key
*/
    unsigned         nadks;      /* Number ADK's available */
    PGPByte          tclass;     /* Class code from ADK */
    PGPError         error;      /* Error return from Aurora */
    PGPByte          pkalg;      /* pkalg of ADK */
    PGPKeyID         keyid;      /* keyid of ADK */
    PGPError         err = kPGPError_NoErr;
    PGPContextRef    context;
    if( IsntNull( adkeyid ) )
        pgpClearMemory( adkeyid, sizeof( *adkeyid ) );
    if ( IsntNull ( adclass ) )
        *adclass  = 0;
    if ( IsntNull( adkey ) )
        *adkey  = NULL;
    ringset = NULL;
    PGPValidateKey( basekey );
    PGPValidateKeySet( allkeys );
    context = PGPGetKeyContext ( basekey );
    error = pgpKeySetRingSet (allkeys, TRUE, &ringset);
    if( IsPGPError( error ) )
        return error;
    keyobj = basekey->key;
    rkey = ringKeyAdditionalRecipientRequestKey (keyobj, ringset, nth,
                    &pkalg, &keyid, &tclass, &nadks, &error);
    if( IsPGPError( error ) )
    {
        ringSetDestroy( (RingSet *) ringset );
        return error;
    }
    /* Success */
    if ( IsntNull( adkey ) )
    {
        PGPKeyID    keyID;
        if (IsNull( rkey ) ) {
            *adkey = NULL;
        } else {
            ringKeyID8 (ringset, rkey, &pkalg, &keyID);
            err = PGPGetKeyByKeyID (allkeys, &keyID,
                        (PGPPublicKeyAlgorithm)pkalg, adkey);
        }
    }
    if ( IsntNull( adkeyid ) )
    {
        *adkeyid   = keyid;
    }
    if ( IsntNull( adclass ) )
        *adclass = tclass;
    if( IsntNull( ringset ) )
        ringSetDestroy( (RingSet *) ringset );
```

-continued

```
    return err;
}
```

Given a key, the system may return the nth (0-based) additional decryption key, if one exists.

```
/*  Given a key, return the nth (0 based) additional decryption key, if
    one exists. Also return the keyid, the class of the ADK, and the
    number of ADK's for the base key. Any of the return pointers may
    be NULL. */
    PGPError
PGPGetIndexedAdditionalRecipientRequestKey(
    PGPKeyRef       basekey,
    PGPKeySetRef    allkeys,
    PGPUInt32       nth,
    PGPKeyRef *     adkey,
    PGPKeyID *      adkeyid,
    PGPByte *       adclass)
{
    PGPError     err = kPGPError_NoErr;
    PGPKeyID     tempKeyID;
    if ( IsntNull( adkey ) )
        *adkey  = NULL;
    if ( IsntNull( adkeyid ) )
        pgpClearMemory( adkeyid, sizeof( *adkeyid) );
    if ( IsntNull( adclass ) )
        *adclass   = 0;
    PGPValidateKey( basekey );
    PGPValidateKeySet( allkeys );
    err = pgpGetIndexedAdditionalRecipientRequestKey( basekey,
            allkeys, nth, adkey, &tempKeyID, adclass );
    if ( IsntPGPError( err ) )
    {
        pgpAssert( pgpKeyIDIsValid( &tempKeyID ) );
        if( IsntNull( adkeyid ) )
        {
            *adkeyid    = tempKeyID;
        }
    }
    else
    {
        pgpClearMemory( adkeyid, sizeof( *adkeyid) );
    }
    return( err );
}
```

Thus once the outside user's system has obtained the MRA's public key, the MRA can be added as a recipient of the message (i.e., a copy of the message's session key is encrypted with the MRA public key). As a result of this, the encrypted message can be recovered, if needed, by the message recovery agent. Specifically, as shown in step 706, the private key of the MRA key pair can be used to decrypt the encrypted message, for recovering the original message.

7. Conclusion

When a user publishes his or her public key, there has previously been no mechanism available for assisting an outside user with the task of including in an automatic and non-intrusive manner the key of an additional recipient, such as one intended for message recovery. By including in the user's key (e.g., an employee) a pointer to a message recovery agent's key (or the MRA key itself), the present invention readily solves the problem.

Appended herewith as Appendix A are C/C++ source code listings providing further description of the present invention. A suitable development environment (e.g., compiler/linker) for compiling the code is available from a variety of compiler vendors, including Microsoft Corporation of Redmond, Wash. and Inprise Corporation (formally, Borland International, Inc.) of Scotts Valley, Calif. A set of comprehensive source listings for PGP 5.5.3i (Windows/Mac) is currently available on the Internet via FTP at ftp://ftp.no.pgpi.com/pub/pgp/5.5/win95nt/pgp553i-win95nt-src.zip (accessible from download page http://www.pgpi.com/download/#5.5i), the disclosure of which is hereby incorporated by reference.

While the invention is described in some detail with specific reference to a single preferred embodiment and certain alternatives, there is no intent to limit the invention to that particular embodiment or those specific alternatives. Although examples have been presented using e-mail, for instance, those skilled in the art will appreciate that the methodology of the present invention may be applied to different modes of electronic communication, including wireless communication. Thus, the true scope of the present invention is not limited to any one of the foregoing exemplary embodiments but is instead defined by the appended claims.

APPENDIX A

```
/*
Copyright (C) 1997 Pretty Good Privacy, Inc.
All rights reserved.
                                                                          */
/* Notes:
The PGP client code does not directly encrypt to MRA's. All of the client
code modules call a "recipient" dialog function which presents a dialog
to the user containing two lists: available encryption keys and
encryption recipients. The user moves these keys from the key list to the
recipient list to choose the encryption recipients. If a key has one or
more associated MRA's, these are also moved to the recipients list and,
depending on the enforcement level of the software and embedded MRA, can
be moved back to the key list. Note that this operation can occur without
ever showing the dialog i. e. the recipients have been specified in an
email plugin via an email address, but the dialog function is always
called nonetheless. The client of the dialog function is returned a
PGPKeySet which contains the explicit and implicit recipients and does not
make this distinction among them.
The following includes .cp and .h files for the Mac implementation of this
dialog. When a user drags one ore more keys from the key list to the
recipient list, the function SendSelectedToRecipients( ) is called which
marks the selected list items in our data structures and then calls
SendMarkedToRecipients( ). SendMarkedToRecipients( ) iterates over each
marked item and, for each marked key, calls
MarkADKeysForUserToRecipientMove( ) to also mark any associated MRA's. A
final pass "moves" all marked items to the recipient list. There is
similar logic for groups, which also appear in these lists.
*/
#include <LGACaption.h>
#include <LGACheckbox.h>
#include <LGAPushButton.h>
#include <PP_KeyCodes.h>
#include <UDrawingUtils.h>
#include <UGAColorRamp.
#include "pgpErrors.h"
#include "pgpGroupsUtil.h"
#include "pgpKeyServer.h"
#include "pgpMem.h"
#include <string.h>
#include "MacStrings.h"
#include "PGPRecipientGrafPort.h"
#include "PGPUILibDialogs.h"
#include "PGPUILibUtils.h"
#include "PGPSharedEncryptDecrypt.h"
#include "CUserIDTable.h"
#include "CPassPhraseEdit.h"
#include "CProgressBar.h"
#include "CFocusBorder.h"
#include "pgpDebug.h"
#include "CPrivateKeysPopup.h"
#include "pflPrefTypes.h"
#include "pgpClientPrefs.h"
#include "pgpEncode.h"
#include "pgpKeys.h"
#if PGP_BUSINESS_SECURITY
#include "pgpAdminPrefs.h"
#endif
enum
{
    kMacBinaryPopupNoneMenuItem      = 1,
    kMacBinaryPopupSmartMenuItem,
    kMacBinaryPopupYesMenuItem
};
const ResID     kWarnSpecialADKDialogID = 4752;
const PaneIDT   kUserIDScrollerPaneID             = 3;
const PaneIDT   kUserIDTablePaneID                = 4;
const PaneIDT   kFileOptionsBoxPaneID             = 6;
```

APPENDIX A-continued

```
const PaneIDT   kTextOutputCheckboxPaneID       = 7;
const PaneIDT   kMacBinaryPopupPaneID           = 8;
const PaneIDT   kRecipientScrollerPaneID        = 9;
const PaneIDT   kRecipientTablePaneID           = 10;
const PaneIDT   kFileConvEncryptCheckboxPaneID  = 11;
const PaneIDT   kWipeOriginalCheckboxPaneID     = 12;
const PaneIDT   kTextOptionsBoxPaneID           = 13;
const PaneIDT   kTextConvEncryptCheckboxPaneID  = 14;
const PaneIDT   kInstructionsCaptionPaneID      = 15;
const PaneIDT   kUpdateFromServerButtonPaneID   = 16;
const PaneIDT   kUserIDFocusBorderPaneID        = 17;
const PaneIDT   kRecipientsFocusBorderPaneID    = 18;
CPGPRecipientGrafPort::CPGPRecipientGrafPort(LStream *inStream)
    : CPGPLibGrafPortView(inStream)
{
    mMacBinaryPopup         = NULL;
    mTextOutputCheckbox     = NULL;
    mWipeOriginalCheckbox   = NULL;
    mConvEncryptCheckbox    = NULL;
    mUpdateFromServerButton = NULL;
    mWindowIsMoveable       = TRUE;
    mWindowIsResizeable     = TRUE;
    mMinMaxSize.top         = 300;       // Minimum resize height
    mMinMaxSize.bottom      = 32000;// Maximum resize height
    mMinMaxSize.left        = 440;       // Minimum resize width
    mMinMaxSize.right       = 640;       // Maximum resize width
    mUserIDListsEnabled     = TRUE;
    mHaveNewKeys            = FALSE;
    mHaveKeyServerSupport   = CFM__AddressIsResolved__( PGPKeyServerInit );
    mClientPrefsRef         = kInvalidPGPPrefRef;
    mAdminPrefsRef          = kInvalidPGPPrefRef;
    mContext                = kInvalidPGPContextRef;
    mEnforceRemoteADKClass  = FALSE;
    mGroupSet               = kInvalidPGPGroupSetRef;
#if PGP__BUSINESS__SECURITY
    mEnforceOutgoingADK     = FALSE;
    mCorporateKeyRef        = kInvalidPGPKeyRef;
    mOutgoingADKRef         = kInvalidPGPKeyRef;
#endif
}
CPGPRecipientGrafPort::~CPGPRecipientGrafPort( )
{
    /* Delete the backing store for the name list */
    PGPRecipientTableItem::DisposeNameData( );
}
    void
CPGPRecipientGrafPort::FinishCreateSelf( )
{
    CFocusBorder      *userIDBorder;
    CPGPLibGrafPortView::FinishCreateSelf( );
    mRecipientTable =
        (CUserIDTable *) FindPaneByID( kRecipientTablePaneID );
    mUserIDTable =
        (CUserIDTable *) FindPaneByID( kUserIDTablePaneID );
    mUserIDTable->InsertCols(1, 1, NULL, 0, TRUE);
    mUserIDTable->AddListener(this);
    mRecipientTable->InsertCols(1, 1, NULL, 0, TRUE);
    mRecipientTable->AddListener (this);
    mRecipientTable->SetAllowDeleteKeyToSend( TRUE );
    mUpdateFromServerButton =
        (LGAPushButton *) FindPaneByID ( kUpdateFromServerButtonPaneID );
    if( mHaveKeyServerSupport )
    {
        mUpdateFromServerButton->AddListener ( this );
    }
    else
    {
        mUpdateFromServerButton->Hide ( );
    }
    userIDBorder = (CFocusBorder *)
            FindPaneByID( kUserIDFocusBorderPaneID );
    SwitchTarget ( userIDBorder );
    AdjustButtons( );
}
    PGPError
CPGPRecipientGrafPort::BuildRecipientList( )
{
    PGPError       err;
    PGPKeyListRef  keyList;
```

APPENDIX A-continued

```
        err = PGPOrderKeySet( mAllKeys, kPGPAnyOrdering, &keyList );
        if( IsntPGPError( err ) )
        {
            PGPKeyIterRet   keyIterator;
            PGPKeyRef       defaultKey      = kInvalidPGPKeyRef;
            if( IsPGPError( PGPGetDefaultPrivateKey( mAllKeys, &defaultKey ) ) )
            {
                defaultKey = (PGPKeyRet) kInvalidPGPKeyRef;
            }
            err = PGPNewKeyIter( keyList, &keyIterator );
            it( IsntPGPError( err ) )
            {
                PGPKeyRet       theKey;
                err = PGPKeyIterNext ( keyIterator, &theKey );
                while( IsntPGPError( err ) )
                {
                    PGPBoolean      keyCanEncrypt;
                    if( IsntPGPError( PGPKeyCanEncrypt( theKey,
                            &keyCanEncrypt ) ) && keyCanEncrypt
                    {
                        Boolean isDefault = theKey == defaultKey;
                        err = mUserIDTable->AddKey( theKey, isDefault, FALSE );
                        if( IsntPGPError( err ) )
                        {
                            // The user value of a key is set to a non-zero
                            // value when it has been added to a display list.
                            // This is convenient for checking for new keys added
                            // to the set via key server searches, etc.
                            err = PGPSetKeyUserVal( theKey,
                                    (PGPUserValue) kKeyStateAddedFromClient );
                        }
                    }
                    if( IsPGPError( err ) )
                        break;
                    err = PGPKeyIterNext( keyIterator, &theKey };
                }
                if( err == kPGPError_EndOfIteration )
                    err = kPGPError_NoErr;
                PGPFreeKeyIter( keyIterator );
            }
            PGPFreeKeyList( keyList );
        }
    }
    /* now add all groups */
    if ( IsntNull( mGroupSet ) )
    {
        PGPUInt32   numGroups;
        err = PGPCountGroupsInSet( mGroupSet, &numGroups );
        if ( IsntPGPError( err ) )
        }
            PGPUInt32   index;
            for( index = 0; index < numGroups; ++index )
            {
                PGPGroupID      id;
                err    = PGPGetIndGroupID( mGroupSet, index, &id );
                if ( IsPGPError( err ) )
                    break;
                err    = mUserIDTable->AddGroup( mAllKeys,
                        mGroupSet, id );
                if ( IsPGPError( err ) )
                    break;
            }
        }
    }
    return( err );
}
    void
CPGPRecipientGrafPort::LockRecipient(UInt32 rowIndex)
{
    PGPRecipientTableItem   tableItem;
    STableCell      cell(rowIndex, 1);
    mRecipientTable->GetCellData( cell, &tableItem );
        tableItem.locked = TRUE;
    mRecipientTable->SetCellData( cell, &tableItem );
}
#if PGP_BUSINESS_SECURITY        // [
// Returns number of recipient keys not signed by the corporate key
    PGPUInt32
CPGPRecipientGrafPort::GetNumKeysNotSignedByCorporateKey(
    CUserIDTable            *whichList,
```

APPENDIX A-continued

```
        PGPKeyRef           corporateKeyRef,
        Boolean             markedOnly)
{
    PGPUInt32           numUnsignedKeys = 0
    PGPKeySetRef        recipients;
    PGPError            err    = kPGPError_NoErr;
    err = whichList->CreateKeySet( mAllKeys, markedOnly, &recipients );
    if ( IsntPGPError( err ) )
    {
        PGPKeyListRef       keyList;
        err = PGPOrderKeySet( recipients, kPGPAnyOrdering, &keyList );
        if( IsntPGPError( err ) )
        {
            PGPKeyIterRef       iter;
            err = PGPNewKeyIter( keyList, &iter );
            if( IsntPGPError( err ) )
            {
                PGPKeyRef       key;
                while( IsntPGPError( err = PGPKeyIterNext( iter, &key ) ) )
                {
                    PGPUserIDRef        userID;
                    PGPBoolean          signedByCorporateKey    = FALSE;
                    /* check all user ids for a corporate sig */
                    /* only one need be signed to qualify */
                    while( IsntPGPError( err =
                        PGPKeyIterNextUserID( iter, &userID)))
                    {
                        PGPSigRef   sig;
                        while( IsntPGPError( err =
                            PGPKeyIterNextIDSig ( iter, &sig)))
                        {
                            PGPKeyRef    certifierKey;
                            err = PGPGetSigCertifierKey( sig,
                                    mAllKeys, &certifierKey);
                            if( IsntPGPError(err) )
                            {
                                if (certifierKey == corporateKeyRef)
                                {
                                    signedByCorporateKey    = TRUE;
                                    break;
                                }
                            }
                        }
                    }
                    if ( ! signedByCorporateKey )
                    {
                        ++numUnsignedKeys;
                    }
                }
                if ( err == kPGPError_EndOfIteration
                    err     = kPGPError_NoErr;
                PGPFreeKeyIter( iter );
            }
            PGPFreeKeyList ( keyList );
        }
        PGPFreeKeySet ( recipients );
    }
    pgpAssertNoErr( err );
    return( numUnsignedKeys );
}
PGPError
CPGPRecipientGrafPort::MoveOutgoingAdditionalKey (void)
{
    PGPError    err = kPGPError_NoErr;
    if( PGPKeyRefIsValid( mOutgoingADKRef ) )
    {
        UInt32      row;
        if( mUserIDTable->HaveKey( mOutgoingADKRef, &row ) )
        {
            mUserIDTable->MarkOneRow( row );
            SendMarkedToRecipients ( );
        }
        if( mRecipientTable->HaveKey( mOutgoingADKRef, &row ) )
        {
            if( mEnforceOutgoingADK )
            {
                LockRecipient( row );
            }
        }
```

APPENDIX A-continued

```
            else if( mEnforceOutgoingADK )
            {
                /* Display an error dialog and return to the caller */
                PGPUIWarningAlert ( kPGPUIGenericOKAlert,
                    kPGPLibDialogsStringListResID,
                    kCorporateADKDisabledOrMissingStrIndex );
                err = kPGPError_UserAbort;
            }
        }
        return ( err );
    }
    #endif      // ] PGP_BUSINESS_SECURITY
        PGPError
    CPGPRecipientGrafPort::AddSearchedKeysToUserIDTable (void)
    {
        // Process the large key list, looking for unprocessed keys
        // and add them to the user ID list.
        PGPKeyListRef      keyList;
        PGPError           err;
        err = PGPOrderKeySet( mAllKeys, kPGPAnyOrdering, &keyList );
        if( IsntPGPError( err ) )
        {
            PGPKeyIterRef      keyIterator;
            err = PGPNewKeyIter( keyList, &keyIterator );
            if( IsntPGPError( err ) )
            {
                PGPKeyRet      theKey;
                err = PGPKeyIterNext( keyIterator, &theKey );
                while( IsntPGPError( err ) )
                {
                    PGPUserValue      keyState;
                    err = PGPGetKeyUserVal( theKey, &keyState );
                    if( IsntPGPError( err ) )
                    {
                        if( keyState == (PGPUserValue) kKeyStateNew )
                        {
                            PGPBoolean      keyCanEncrypt;
                            if( IsntPGPError( PGPKeyCanEncrypt( theKey,
                                    &keyCanEncrypt ) ) && keyCanEncrypt )
                            {
                                err = mUserIDTable->AddKey( theKey, FALSE, FALSE );
                                if( IsntPGPError( err ) )
                                {
                                    err = PGPSetKeyUserVal ( theKey,
                                        (PGPUserValue) kKeyStateAddedFromKeySearch );
                                }
                            }
                        }
                    }
                    if( IsPGPError( err ) )
                        break;
                    err = PGPKeyIterNext( keyIterator, &theKey );
                }
                if( err == kPGPError_EndOfIteration )
                    err = kPGPError_NoErr;
                PGPFreeKeyIter ( keyIterator );
            }
            PGPFreeKeyList( keyList );
        }
        return( err );
    }
    /*
        Locate missing recipient keys and missing group keys and add them
        to the set of all known keys and, in the case of missing keys,
        create list items in the user ID table. The group counts, group
        validity, and key validities are all recomputed.
    */
        PGPError
    CPGPRecipientGrafPort::FindMissingRecipients(void)
    {
        PGPError         err = kPGPError_NoErr;
        PGFKeySetRef     searchResults;
        err = PGPNewKeySet( mContext, &searchResults );
        if( IsntPGPError( err ) )
        {
            TableIndexT        numRows;
            TableIndexT        numColumns;
            TableIndexT        rowIndex;
            Boolean            foundNewKeys;
```

APPENDIX A-continued

```
            foundNewKeys = FALSE;
            mRecipientTable->GetTableSize( numRows, numColumns );
            for( rowIndex = 1; rowIndex <= numRows; rowIndex++ )
            {
                PGPRecipientTableItem    tableItem;
                STableCell               cell(rowIndex, 1);
                PGPKeySetRef             newKeys;
                newKeys = kInvalidPGPKeysetRef;
                mRecipientTable->GetCellData( cell, &tableItem );
                if( tableItem.itemKind == kTableItemKindMissing Key )
                    err = PGPGetKeyFromServerInternal( mContext, mClientPrefsRef,
                            NULL, kInvalidPGPKeyRef,
                            tableItem.GetNamePtr( ), 30, &newKeys );
            }
            else if( tableItem.itemKind == kTableItemKindGroup )
            {
                err = PGPGetGroupFromServerInternal( mContext, mClientPrefsRef,
                        tableItem.group.set, tableItem.group.id,
                        NULL, 30, &newKeys );
            }
            pgpAssertNoErr( err );
            if( IsntPGPError( err ) && PGPKeySetRefIsvalid( newKeys ) )
            }
                foundNewKeys = TRUE;
                err = PGPAddKeys( newKeys, searchResults );
                if( IsntPGPError( err ) )
                {
                    err = PGPCommitKeyRingChanges ( searchResults );
                }
            }
                if( PGPKeySetRefIsValid( newKeys ) )
                    (void) PGPFreeKeySet ( newKeys );
                if( IsPGPError( err ) )
                    break;
        }
        if( IsntPGPError( err ) && foundNewKeys )
            err = PGPAddKeys( searchResults, mAllKeys );
            if( IsntPGOError( err ) )
            {
                err = PGPCheckKeyRingSigs( searchResults,
                        mAllKeys, FALSE, NULL, 0 );
                if( IsntPGPError( err ) )
                    err = PGPPropagateTrust ( mAllKeys );
                    if( IsntPGPError( err ) )
                        err = PGPCommitKeyRingChanges ( mAllKeys );
                    }
                }
            }
        }
        (void) PGPFreeKeyset ( searchResults );
        if( IsntPGPError( err ) && foundNewKeys )
        {
            mHaveNewKeys = TRUE;
            err = AddSearchedKeysTouserIDTable( );
        }
        /* Always update validity because we may have partial success */
        mUserIDTable->UpdateGroupValidityAndKeyCounts ( mAllKeys );
        mRecipientTable->UpdateGroupValidityAndKeyCounts ( mAllKeys );
    }
    return ( err );
}
/*
    Update missing recipients. Find missing recipients and remove
    them from the recipient table and replace with one or more
    user id's if they were added to the user ID list.
*/
    void
CPGPRecipientGrafPort::UpdateMissingRecipients(
    Boolean         *foundAmbiguousKeys)
{
    *foundAmbiguousKeys = FALSE;
    if( mHaveKeyServerSupport )
    {
        PGPError    err = kPGPError_NoErr;
        err = FindMissingRecipients( );
        if( IsntPGPError( err ) )
        {
            TableIndexT    numRows;
            TableIndexT    numColumns;
```

APPENDIX A-continued

```
        TableIndexT      rowIndex;
/*
    Mark the users in the user table which should be
    moved to the recipient table and mark the missing keys
    in the recipient table which should be deleted
*/
mRecipientTable->UnmarkAll( );
mUserIDTable->UnmarkAll( );
mRecipientTable->GetTableSize( numRows, numColumns );
for( rowIndex = 1; rowIndex <= numRows; rowIndex++ )
{
    PGPRecipientTableItem    tableItem;
    STableCell               cell(rowIndex, 1);
    mRecipientTable->GetCellData( cell, &tableItem );
    if( tableItem.itemKind == kTableItemKindMissingKey )
    {
        Boolean   matchedMultiple;
        if( FindAndMarkUser( tableItem.GetNamePtr( ),
                &matchedMultiple ) )
        {
            if( matchedMultiple )
                *foundAmbiguousKeys = TRUE;
            tableItem.marked = TRUE;
            mRecipientTable->SetCellData( cell, &tableItem );
        }
    }
}
SendMarkedToRecipients ( );
/* Delete found (marked) recipient table items */
mRecipientTable->GetTableSize( numRows, numColumns );
for( rowIndex = numRows; rowIndex >= 1; rowIndex-- )
{
    PGPRecipientTableItem    tableItem;
    STableCell               cell(rowIndex, 1);
    mRecipientTable->GetCellData( cell, &tableItem );
    if( tableItem.marked )
        mRecipientTable->RemoveRows( 1, rowIndex, FALSE );
}
mRecipientTable->Refresh( );
mUserIDTable->Refresh( );
AdjustButtons( );
}
if( IsPGPError( err ) && err != kPGPError_UserAbort )
}
    Str255        errorStr;
    PGPGetErrorString( err, sizeof( errorStr ),
        (char *) errorStr );
    CToPString( (char *) errorStr, errorStr );
```

What is claimed is:

1. In a computer system providing public key cryptography, a method for assisting with recovery of messages sent to users, the method comprising:

generating a first key pair for a particular user, the first key pair comprising a public key employed for encrypting messages sent to the particular user and comprising a private key employed for decrypting messages which have been encrypted using the public key of the first key pair;

generating a second key pair for message recovery, the second key pair comprising a public key employed for recovering messages which have been encrypted using the public key of the first key pair and comprising a private key employed for decrypting messages which have been encrypted using the public key of the second key pair;

embedding within the public key of the first key pair information characterizing the public key of the second key pair;

employing the public key of the first key pair during encryption of a message to create an encrypted copy of a random session key that has been employed directly to encrypt the message; and when the public key of the first key pair is employed during encryption of a message, automatically employing the public key of the second key pair during encryption of the message so that the message being encrypted can be recovered using the private key of the second key pair.

2. The method of claim 1, wherein the method employs the public key of the second key pair during encryption of the message to create another encrypted copy of the random session key.

3. The method of claim 2, wherein message recovery is provided by employing the private key of the second key pair to recovery the copy of the random session key which was encrypted with the public key of the second key pair, and thereafter decrypting the encrypted message using the recovered random session key.

4. The method of claim 1, wherein the random session key is employed directly to encrypt the message using a block cipher.

5. The method of claim 4, wherein said block cipher comprises a block cipher selected from one of CAST, IDEA, and triple-DES block ciphers.

6. In a public key cryptosystem, a method allowing recovery of messages encrypted by the system, the method comprising:

generating public and private keys for a message recovery agent;

generating public and private keys for a particular user;

embedding within the public key of the particular user information describing the public key of the message recovery agent; and encrypting a message by:
- encrypting the message with a session key,
- encrypting the session key using the public key of the particular user, and
- automatically encrypting the session key using the public key of the message recovery agent, so the encrypted message can be recovered using the private key of the message recovery agent.

7. The method of claim 6, wherein said embedding step includes:

requiring the particular user to digitally sign his or her own public key, for providing consent to recovery of messages that have been encrypted using the public key of the particular user.

8. The method of claim 6, wherein said embedding step is performed using a cryptographic hash for guarding against tampering.

9. The method of claim 6, wherein said information describing the public key of the message recovery agent comprises an identifier for uniquely identifying the public key of the message recovery agent.

10. The method of claim 6, wherein said information describing the public key of the message recovery agent comprises an identifier for uniquely identifying the public key of the message recovery agent residing on a key server, said method further comprising:

downloading a copy of the public key of the message recovery agent from the key server.

11. The method of claim 6, wherein said information describing the public key of the message recovery agent comprises a copy of the public key of the message recovery agent.

12. The method of claim 6, wherein said embedding step comprises:

appending assertion information to the public key of the particular user, said assertion information including a pointer which uniquely identifies the public key of the message recovery agent.

13. The method of claim 12, wherein said assertion information includes constraints specifying use of the public key of the particular user.

14. The method of claim 13, wherein said constraints specify an expiration date for the public key of the particular user.

15. The method of claim 13, wherein said constraints specify whether use of the public key of the message recovery agent during encryption of a message is mandatory.

16. The method of claim 6, further comprising:

recovering the encrypted message by:
- decrypting with the private key of the message recovery agent the copy of the session key which was encrypted using the public key of the message recovery agent, for recovering the session key used for encrypting the message, and
- decrypting the message with the recovered session key.

17. The method of claim 6, wherein said session key is randomly generated during said encrypting step.

18. The method of claim 6, wherein the session key is employed to encrypt the message using a block cipher.

19. The method of claim 18, wherein said block cipher comprises a block cipher selected from one of IDEA, Blowfish, and DES block ciphers.

20. The method of claim 6, wherein the public and private keys of the particular user comprise a Diffie-Hellman-compatible key pair.

21. The method of claim 6, wherein the public and private keys of the particular user comprise an RSA-compatible key pair.

22. The method of claim 6, wherein said encrypting step includes:

displaying a first list of public keys for potential recipients, the first list including the public key of the particular user;

displaying a second list of public keys which have been selected from the first list;

receiving user input for selecting from the first list the public key of the particular user; and in response to said user input, adding both the public key of the particular user and the public key for the message recovery agent to the second list.

23. The method of claim 22, further comprising:

in response to additional user input, removing the public key for the message recovery agent from the second list.

24. The method of claim 23, further comprising:

displaying a warning if removal of the public key for the message recovery agent from the second list violates a policy defined for the public key of the particular user.

25. The method of claim 6, wherein said message being encrypted comprises an e-mail message.

26. A cryptosystem providing message recovery comprising:

key generation means for generating public and private keys for a message recovery agent and for generating public and private keys for a particular user, said means including means for embedding within the public key of the particular user information associating the public key of the message recovery agent with the public key of the particular user;

encryption means for encrypting a message with a random session key; and means for appending to the encrypted message the random session key that has been encrypted using the public key of the particular user, and for appending to the encrypted message the random session key that has been automatically encrypted using the public key of the message recovery agent, so that the encrypted message can be ultimately recovered using the private key of the message recovery agent.

27. The system of claim 26, wherein said encryption means include block cipher encryption means.

28. The system of claim 26, wherein said information associating the public key of the message recovery agent comprises an identifier for uniquely identifying the public key of the message recovery agent.

29. The system of claim 26, wherein said information associating the public key of the message recovery agent comprises an identifier for uniquely identifying the public key of the message recovery agent residing on a key server, said system further comprising means for downloading a copy of the public key of the message recovery agent from the key server.

30. The system of claim 26, wherein said information associating the public key of the message recovery agent comprises a copy of the public key of the message recovery agent.

31. The system of claim 26, wherein said means for appending operates under user control to optionally append a copy of the random session key that has been encrypted using the public key of the message recovery agent.

* * * * *